United States Patent
Bassov et al.

(10) Patent No.: US 10,452,616 B1
(45) Date of Patent: Oct. 22, 2019

(54) TECHNIQUES FOR IMPROVING STORAGE SPACE EFFICIENCY WITH VARIABLE COMPRESSION SIZE UNIT

(71) Applicant: EMC IP Holding Company LLC, Hopkinton, MA (US)

(72) Inventors: Ivan Bassov, Brookline, MA (US); Sorin Faibish, Newton, MA (US); Istvan Gonczi, Berkley, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/173,579

(22) Filed: Oct. 29, 2018

(51) Int. Cl.
  *G06F 16/00* (2019.01)
  *G06F 3/00* (2006.01)
  *G06F 16/174* (2019.01)
  *G06F 3/06* (2006.01)

(52) U.S. Cl.
  CPC ........ *G06F 16/1744* (2019.01); *G06F 3/0608* (2013.01); *G06F 3/0641* (2013.01); *G06F 3/0679* (2013.01); *G06F 16/1752* (2019.01)

(58) Field of Classification Search
  None
  See application file for complete search history.

(56) References Cited

U.S. PATENT DOCUMENTS

| | | | | |
|---|---|---|---|---|
| 9,367,557 | B1 * | 6/2016 | Lin | G06F 16/1744 |
| 2014/0244604 | A1 * | 8/2014 | Oltean | H03M 7/3091 |
| | | | | 707/693 |

OTHER PUBLICATIONS

ForensickB, "Computer Forensics, Malware Analysis & Digital Investigations," http://www.forensicb.com/2013/03/file-entropy-explained.html, Mar. 20, 2013.
Wikipedia, "Entropy (information theory)," https://en.wikipedia.org/wiki/Entropy_(information_theory), Sep. 9, 2018.
Werner Ebeling, et al., "Entropy and Compressibility of Symbol Sequences," PhysComp96, Institute of Physics, Humboldt University, Feb. 23, 1997.
Kedarnath J. Balakrishnan, "Relationship Between Entropy and Test Data Compression," IEEE Transactions on Computer-Aided Design of Integrated Circuits and Systems, vol. 26, No. 2, Feb. 2007.

* cited by examiner

*Primary Examiner* — David Yi
*Assistant Examiner* — Craig S Goldschmidt
(74) *Attorney, Agent, or Firm* — Muirhead and Saturnelli, LLC

(57) ABSTRACT

Techniques for data processing a data set may comprise: performing first processing that forms a first compression unit, wherein the first compression unit includes a data chunks including a first data chunk having a first entropy value less than an entropy threshold, the first processing including: receiving a second data chunk; determining, in accordance with criteria, whether to add the second data chunk to the first compression unit; and responsive to determining to add the second data chunk to the first compression unit, adding the second data chunk to the first compression unit; and compressing the first compression unit as a single compressible unit. The second chunk may be added if its entropy value is less than the entropy threshold and if entropy values of the first and second chunks are similar. The second chunk may be added if the resulting compression unit provides sufficient storage/compression benefit.

21 Claims, 12 Drawing Sheets

TECHNIQUES FOR IMPROVING STORAGE SPACE EFFICIENCY WITH VARIABLE COMPRESSION SIZE UNIT

BACKGROUND

Technical Field

This application generally relates to data storage and, in particular, data compression.

Description of Related Art

Systems may include different resources used by one or more host processors. Resources and host processors in the system may be interconnected by one or more communication connections, such as network connections. These resources may include, for example, data storage devices such as those included in the data storage systems manufactured by Dell Inc. These data storage systems may be coupled to one or more host processors and provide storage services to each host processor. Multiple data storage systems from one or more different vendors may be connected and may provide common data storage for one or more host processors in a computer system.

A host may perform a variety of data processing tasks and operations using the data storage system. For example, a host may issue I/O operations, such as data read and write operations, received at a data storage system. Host systems may store and retrieve data by issuing the I/O operations to the data storage system containing a plurality of host interface units, disk drives (or more generally storage devices), and disk interface units. The host systems access the storage devices through a plurality of channels provided therewith. Host systems provide data and access control information through the channels to a storage device of the data storage system and data of the storage device is also provided from the data storage system to the host systems also through the channels. The host systems do not address the disk drives of the data storage system directly, but rather, access what appears to the host systems as a plurality of files, objects, logical units, logical devices or logical volumes. Thus, the I/O operations issued by the host may be directed to a particular storage entity, such as a file or logical device. The logical devices may or may not correspond to the actual physical drives. Allowing multiple host systems to access the single data storage system allows the host systems to share data stored therein.

SUMMARY OF THE INVENTION

In accordance with one aspect of the techniques herein is a method of data processing for a data set comprising: performing first processing that forms a first compression unit, wherein the first compression unit includes a first plurality of data chunks including a first data chunk having a first entropy value less than an entropy threshold, the first processing including: receiving a second data chunk; determining, in accordance with criteria, whether to add the second data chunk to the first compression unit; and responsive to determining to add the second data chunk to the first compression unit, adding the second data chunk to the first compression unit; and compressing the first compression unit as a single compressible unit. The criteria may specify to add the second data chunk to the first compression unit if adding the second data chunk to the first compression unit is estimated to provide at least a specified storage savings benefit. Determining whether to add the second data chunk to the first compression unit may include: determining whether a revised estimated compression ratio associated with adding the second data chunk to the compression unit is larger than an estimated compression ratio associated with the first compression unit without the second data chunk; and responsive to determining the revised estimated compression ratio is larger than the estimated compression ratio, determining to add the second data chunk to the first compression unit. Determining whether to add the second data chunk to the first compression unit may include: determining whether a cumulative entropy value associated with adding the second data chunk to the compression unit is smaller than another entropy value associated with the first compression unit without the second data chunk; and responsive to determining the cumulative entropy value associated with adding the second data chunk to the compression unit is smaller than the another entropy value associated with the first compression unit without the second data chunk, determining to add the second data chunk to the first compression unit. The first data chunk and the second data chunk may be located at consecutive sequential logical addresses of the data set. The first data chunk may be written by a first I/O operation and the second data chunk may be written by a second I/O operation. The first processing may be performed as part of inline processing of an I/O path when processing the first I/O operation and the second I/O operation. The first processing may be performed offline and not part of inline processing of an I/O path when processing the first I/O operation and the second I/O operation. The second data chunk may be added to the first compression unit, wherein the first compression unit may include at least two data chunks prior to adding the second data chunk, wherein the cumulative entropy value may be an entropy value determined based on cumulative frequencies of symbols in the at least two data chunks combined with the second data chunk, and wherein the another entropy value may be a second cumulative entropy values determined based on cumulative frequencies of the symbols in the at least two data chunks without the second data chunk. The second chunk may be added to the first compression unit, wherein a first set of one or more data chunks may include at least the first data chunk, wherein the first compression unit may include the first set of one or more data chunks prior to adding the second chunk, and wherein the criteria may specify to add the second data chunk to the first compression unit if the second data chunk has an associated entropy value less than the entropy threshold, and if the second data chunk and the first set of one or more data chunks have similar entropy values. Second criteria may be used in determining whether the second data chunk and the first set of one or more data chunks have similar entropy values. The second criteria may include determining whether entropy values of the second data chunk and the first set of data chunks all fall within a specified range or are no more than a threshold numerical distance from one another. The first compression unit may be a first size and includes a first number of data chunks of the data set. The method may include forming a second compression unit that is a second size and includes a second number of data chunks of the data set, the first number being different than the second number; and compressing the second compression unit as a single compressible unit.

In accordance with another aspect of techniques herein is a system comprising: a processor; and a memory comprising code stored thereon that, when executed, performs a method of data processing for a data set comprising: performing first processing that forms a first compression unit, wherein the first compression unit includes a first plurality of data chunks including a first data chunk having a first entropy value less than an entropy threshold, the first processing including: receiving a second data chunk; determining, in accordance with criteria, whether to add the second data chunk to the first compression unit; and responsive to determining to add the second data chunk to the first compression unit, adding the second data chunk to the first compression unit; and compressing the first compression unit as a single compressible unit.

In accordance with another aspect of techniques herein is a computer readable medium comprising code stored thereon that, when executed, performs a method of data processing for a data set comprising: performing first processing that forms a first compression unit, wherein the first compression unit includes a first plurality of data chunks including a first data chunk having a first entropy value less than an entropy threshold, the first processing including: receiving a second data chunk; determining, in accordance with criteria, whether to add the second data chunk to the first compression unit; and responsive to determining to add the second data chunk to the first compression unit, adding the second data chunk to the first compression unit; and compressing the first compression unit as a single compressible unit. The criteria may specify to add the second data chunk to the first compression unit if adding the second data chunk to the first compression unit is estimated to provide at least a specified storage savings benefit. Determining whether to add the second data chunk to the first compression unit may include: determining whether a revised estimated compression ratio associated with adding the second data chunk to the compression unit is larger than an estimated compression ratio associated with the first compression unit without the second data chunk; and responsive to determining the revised estimated compression ratio is larger than the estimated compression ratio, determining to add the second data chunk to the first compression unit. Determining whether to add the second data chunk to the first compression unit may include: determining whether a cumulative entropy value associated with adding the second data chunk to the compression unit is smaller than another entropy value associated with the first compression unit without the second data chunk; and responsive to determining the cumulative entropy value associated with adding the second data chunk to the compression unit is smaller than the another entropy value associated with the first compression unit without the second data chunk, determining to add the second data chunk to the first compression unit. The first data chunk and the second data chunk may be located at consecutive sequential logical addresses of the data set. The first data chunk may be written by a first I/O operation and the second data chunk may be written by a second I/O operation and the first I/O operation. The first I/O operation and the second I/O operations may or may not be sequentially issued I/O operations.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
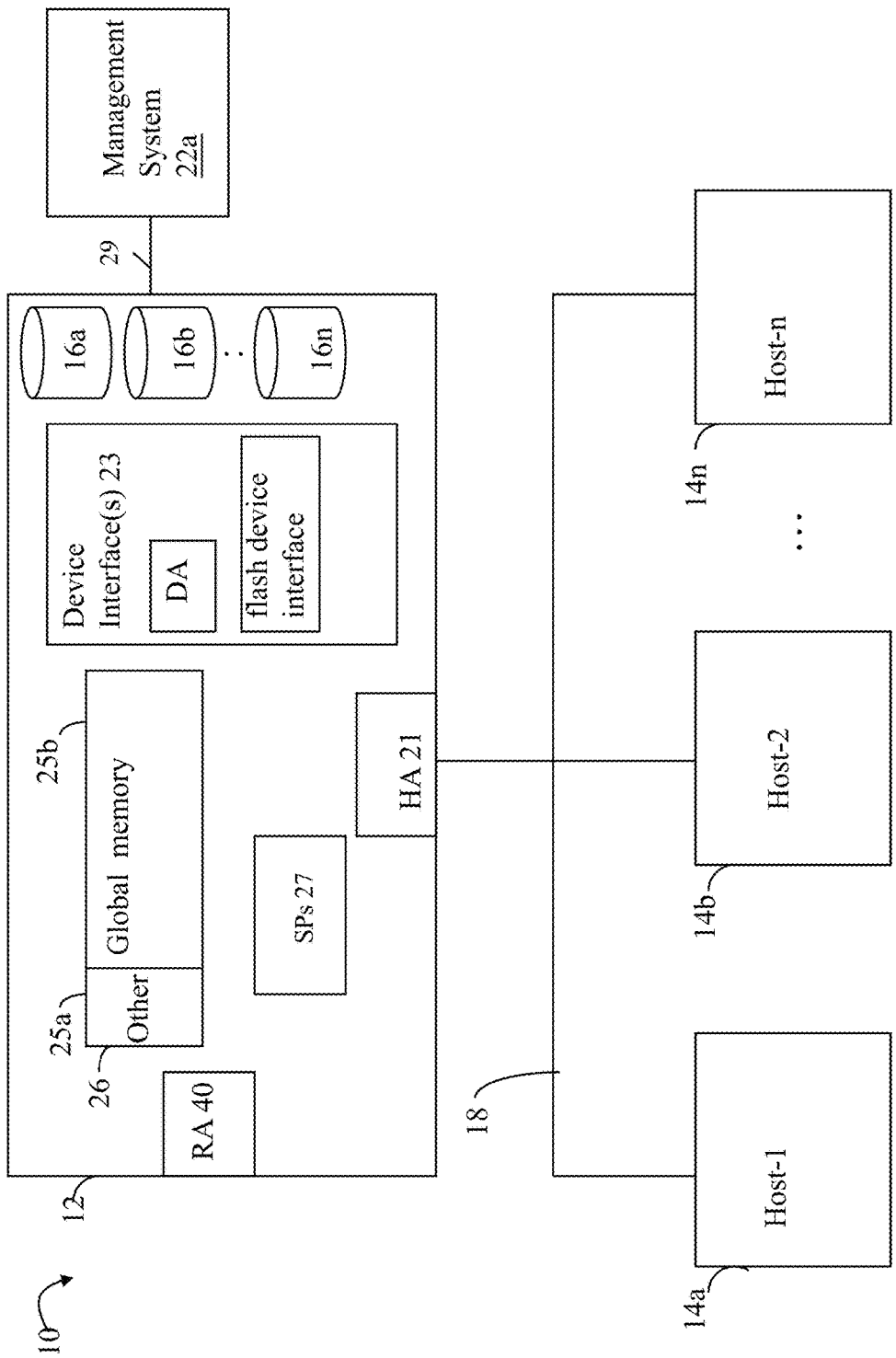
FIGS. 1 and 2B are examples of components that may be included in a system in accordance with techniques described herein.

Referring to FIG. 1, shown is an example of an embodiment of a system that may be used in connection with performing the techniques described herein. The system 10 includes a data storage system 12 connected to host systems 14a-14n through communication medium 18. In this embodiment of the computer system 10, and the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as block-based protocols (e.g., SCSI, Fibre Channel, iSCSI), file system-based protocols (e.g., NFS), and the like. Some or all of the connections by which the hosts and data storage system may be connected to the communication medium may pass through other communication devices, such switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment may include data storage arrays or other components from one or more vendors. In subsequent examples illustrated the techniques herein, reference may be made to a single data storage array by a vendor. However, as will be appreciated by those skilled in the art, the techniques herein are applicable for use with other data storage arrays by other vendors and with other components than as described herein for purposes of example.

The data storage system 12 may be a data storage appliance or a data storage array including a plurality of data storage devices (PDs) 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. SSD may refer to solid state electronics devices as distinguished from electromechanical devices, such as hard drives, having moving parts. Flash devices or flash memory-based SSDs are one type of SSD that contains no moving mechanical parts. The flash devices may be constructed using nonvolatile semiconductor NAND flash memory. The flash devices may include, for example, one or more SLC (single level cell) devices and/or MLC (multi level cell) devices.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a system cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN (s) residing thereon. A flash device interface may be another type of device interface used in connection with facilitating data transfers to/from the associated flash devices and LUN(s) residing thereon. It should be noted that an embodiment may use the same or a different device interface for one or more different types of devices than as described herein.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

It should be noted that although examples of techniques herein may be made with respect to a physical data storage system and its physical components (e.g., physical hardware for each HA, DA, HA port and the like), techniques herein may be performed in a physical data storage system including one or more emulated or virtualized components (e.g., emulated or virtualized ports, emulated or virtualized DAs or HAs), and also a virtualized or emulated data storage system including virtualized or emulated components.

Also shown in FIG. 1 is a management system 22a that may be used to manage and monitor the system 12. In one embodiment, the management system 22a may be a computer system which includes data storage system management software or application such as may execute in a web browser. A data storage system manager may, for example, view information about a current data storage configuration such as LUNs, storage pools, and the like, on a user interface (UI) in a display device of the management system 22a. Alternatively, and more generally, the management software may execute on any suitable processor in any suitable system. For example, the data storage system management software may execute on a processor of the data storage system 12.

It should be noted that each of the different adapters, such as HA 21, DA or disk interface, RA, and the like, may be implemented as a hardware component including, for example, one or more processors, one or more forms of memory, and the like. Code may be stored in one or more of the memories of the component for performing processing.

The device interface, such as a DA, performs I/O operations on a physical device or drive 16a-16n. In the following description, data residing on a LUN may be accessed by the device interface following a data request in connection with I/O operations. For example, a host may issue an I/O operation which is received by the HA 21. The I/O operation may identify a target location from which data is read from, or written to, depending on whether the I/O operation is, respectively, a read or a write operation request. The target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and logical address or offset location on the LUN, to its corresponding physical storage device (PD) and location on the PD. The DA which services the particular PD may further perform processing to either read data from, or write data to, the corresponding physical device location for the I/O operation.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of FIG. 1 may be a data storage system, such as the Dell EMC Unity® data storage system. that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, memory 26 may represent memory of each such storage processor.

Generally, techniques herein may be used in connection with any suitable storage system, appliance, device, and the like, in which data is stored. For example, an embodiment may implement techniques herein using a midrange data storage system, such as a Dell EMC Unity® data storage system, as well as a high end or enterprise data storage system, such as a Dell EMC™ PowerMAX™ data storage system.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receiving a response (possibly including requested data) in connection such I/O commands.

The control path, also sometimes referred to as the management path, may be characterized as the path or flow of data management or control commands through a system. For example, the control or management path may be the logical flow through hardware and software components or layers in connection with issuing data storage management command to and/or from a data storage system, and also receiving responses (possibly including requested data) to such control or management commands. For example, with reference to FIG. 1, the control commands may be issued from data storage management software executing on management system 22a to the data storage system 12. Such commands may be, for example, to establish or modify data services, provision storage, perform user account management, and the like. For example, commands may be issued over the control path to provision storage for LUNs, create a snapshot, define conditions of when to create another snapshot, define or establish local and/or remote replication services, define or modify a schedule for snapshot or other data replication services, define a RAID group, obtain data storage management and configuration information for display in a graphical user interface (GUI) of a data storage management program or application, generally modify one or more aspects of a data storage system configuration, list properties and status information regarding LUNs or other storage objects (e.g., physical and/or logical entities in the data storage system), and the like.

The data path and control path define two sets of different logical flow paths. In at least some of the data storage system configurations, at least part of the hardware and network connections used for each of the data path and control path may differ. For example, although both control path and data path may generally use a network for communications, some of the hardware and software used may differ. For example, with reference to FIG. 1, a data storage system may have a separate physical connection 29 from a management system 22a to the data storage system 12 being managed whereby control commands may be issued over such a physical connection 29. However, it may be that user I/O commands are never issued over such a physical connection 29 provided solely for purposes of connecting the management system to the data storage system. In any case, the data path and control path each define two separate logical flow paths.

An embodiment of a data storage system in accordance with techniques herein may perform different data processing operations or services on stored user data. For example, the data storage system may perform one or more data reduction operations, such as data deduplication and compression, as well as other types of operations or services.

Such data reduction operations attempt to reduce the amount of storage needed for storing data on non-volatile backend storage devices (e.g., PDs) with the goal of reducing the cost per unit of storage consumed (e.g., dollar cost per GB of storage). Generally, data deduplication and compression techniques are known in the art and any suitable such technique may be used in an embodiment in accordance with techniques herein. In at least one embodiment, the compression technique may be a lossless compression technique such as an algorithm from the Lempel Ziv algorithm family (e.g., LZ77, LZ78, LZW, LZR, and the like). In at least one embodiment in accordance with techniques herein, data deduplication processing performed may include digest or hash value computation using an algorithm such as based on the SHA-256 hashing algorithm known in the art. Data deduplication generally refers to removing redundant or duplicate data portions. Data deduplication techniques may include looking for duplicate data chunks whereby only a single instance of the data chunk is retained (stored on physical storage) and where pointers or references may be used in connection with duplicate or redundant copies (which reference or identify the single stored instance of the data chunk).

Figure 2A:
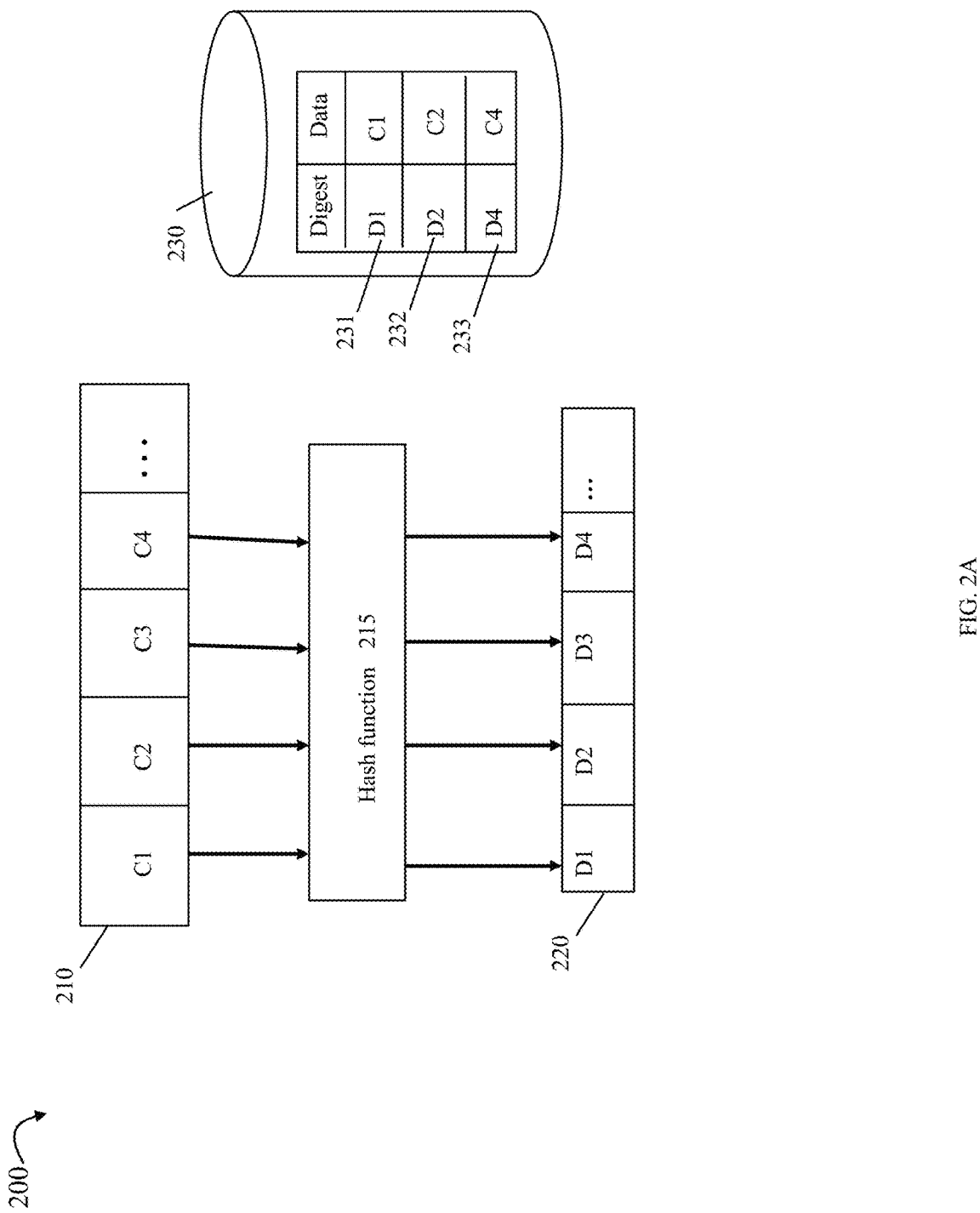
FIG. 2A is an example illustrating data deduplication as may be performed in an embodiment in accordance with techniques herein.

Referring to FIG. 2A, shown is an example 200 illustrating processing that may be performed in connection with data deduplication processing in an embodiment in accordance with techniques herein. Element 210 may denote the original data being written or stored on back-end non-volatile storage. The original data may be partitioned into multiple data chunks C1, C2, C3, C4 and the like. In at least one embodiment and for purposes of illustration, the data chunks may all be the same size where the size may vary with embodiment. As a variation depending on the data deduplication technique utilized, the chunks of 210 may be of varying or different sizes. Each chunk is provided as an input to hash function 215. As noted above, in at least one embodiment, the hash function 215 may be the SHA-256 hashing algorithm, or more generally, any suitable cryptographic hashing function known in the art. For each chunk of 210, the hash function 215 may perform processing and generate, as an output, a hash value or digest. Element 220 includes digests D1, D2, D3, D4, and the like, where a corresponding different one of the digests DN is generated for one of the chunks CN (where "N" is an integer denoting the chunk and associated digest generated for that chunk). For example, D1 is the digest generated for C1, D2 is the digest generated for C2, D3 is the digest generated for C3, and so on. Generally, a hash function 215 is selected which has an acceptably low probability of a "hash collision" of generating the same digest or hash value for two different chunks. The strength of the hash function 215 may be measured by the unlikelihood of a collision occurring two different input chunks of data produce the same digest. The strength increases with the bit length of the hash value or digest. Thus, if two chunks, such as C1 and C3, have the same digests whereby D1=D3, then chunks C1 and C3 match (e.g., are identical matching data chunks). If two chunks, such as C1 and C4, have different digests whereby D1 does not equal D4, then chunks C1 and C4 do not match (e.g., are different or non-matching data chunks). In cases where two matching or identical chunks have the same digest, only a single copy of the data chunk is stored on backend non-volatile physical storage of the data storage system. The single stored instance of the data chunk may be referenced using a pointer, handle, the digest of the chunk, and the like.

Element 230 of FIG. 2A may denote the data store used to store data chunks. In this example, as noted above, assume chunks C1 and C3 are the same with remaining chunks C2 and C4 being unique. The data store 230 may also be referred to as a single instance store (SIS). In at least one embodiment, element 230 may be organized and managed using a data structure, such as a hash table. In at least one embodiment, computed digests may be used as an index into the hash table where the single unique instances of data chunks may be stored (along with other metadata as may be needed for maintaining the table and also in accordance with the particular hash table management used in an embodiment). Hash tables are data structures known in the art. A hash table uses a hash function to compute an index into an array of buckets or slots, from which the desired data can be found. In this example, the chunk of data may be mapped by hash function 215, and thus by the chunk's digest, to a particular entry in the table at which the chunk data is stored. To further illustrate, the hash function 215 may be used to generate a digest for a particular data chunk. The digest is then further mapped (e.g., such as by another mathematical function, using particular portions of the digest, and the like) to a particular index or entry of the hash table. The particular mapping used to map the digest to a corresponding table entry varies, for example, with the digest and the size of hash table.

When storing a new data chunk, such as C1, its digest may be mapped to a particular hash table entry 231 whereby if the table entry is null/empty, or otherwise does not already include a data chunk matching C1, then C1 is stored in the table entry along with its associated digest D1 (this is the first time chunk C1 is recorded in the data store 230). Otherwise, if there is already an existing entry in the table including a data chunk matching C1, it indicates that the new data chunk is a duplicate of an existing chunk. In this example as noted above, processing is performed for C1, C2, and C4 respectively, where entries 231, 232, and 233 are added since there are no existing matching entries in the hash table. When processing chunk C3, as noted above, C3 has a digest D3 matching D1 whereby C3 (and thus D3) maps to entry 231 of the hash table already including a matching chunk C1 (so no additional data chunk is added to 230 for C3 since C3 is determined as a duplicate of C1). In connection with representing a particular file or other storage entity including multiple duplicate occurrences of a particular chunk such as C3, the single instance or copy of the data may be stored in 230. Additionally, a handle or reference, such as identifying the hash table entry 231, its digest, and the like, may be used to reference the single instance or copy of the data storage in 230. When reconstructing or restoring data such as the file to its original form, the handle or reference into the hash table for chunk C3 may be used to obtain the actual C3 chunk of data from 230.

Figure 2B:
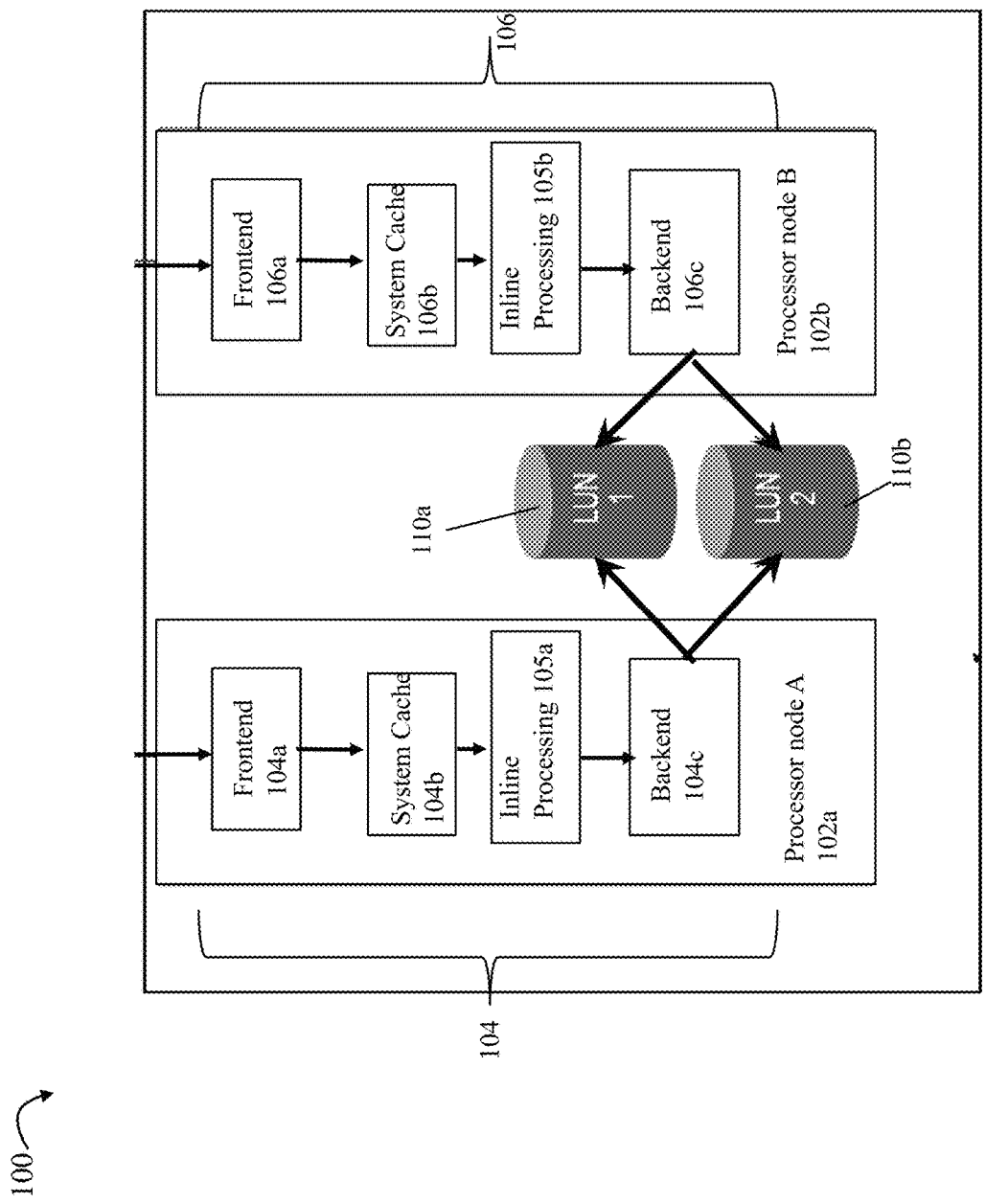

With reference to FIG. 2B, shown is an example 100 illustrating components that may be included in the data path in at least one existing data storage system in accordance with techniques herein. The example 100 includes two processor nodes A 102a and B 102b and associated software stacks 104, 106 of the data path where I/O requests may be received by either processor node 102a or 102b. In the example 200, the data path 104 of processor node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and permanent non-volatile storage (e.g., back end physical non-volatile storage devices accessed by BE components such as DAs as described herein). During movement of data in and out of the system cache layer 104b (e.g., such as in connection with read and writing data respectively, to physical storage 110a, 110b, inline processing may be performed by layer 105a. Such inline processing operations of 105a may be optionally performed and may include any one of more data processing operations in connection with data that is flushed from system cache layer 104b to back-end non-volatile physical storage 110a, 110b, as well as when retrieving data from back-end non-volatile physical storage 110a, 110b to be stored in system cache layer 104b. In at least one embodiment, the inline processing may include performing compression and data duplication. Although in following paragraphs reference may be made to inline processing including compression and data deduplication, more generally, the inline processing may include performing any suitable or desirable data processing operations as part of the I/O or data path (e.g., where such operations may include any of compression and data deduplication, as well as any other suitable data processing operation).

In a manner similar to that as described for data path 104, the data path 106 for processor node B 102b has its own FE component 106a, system cache layer 106b, inline processing layer 105b, and BE component 106c that are respectively similar to components 104a, 104b, 105a and 104c. Elements 110a, 110b denote physical storage provisioned for LUNs whereby an I/O may be directed to a location or logical address to read data from, or write data to, the logical address. The LUNs 110a, 110b are examples of storage objects representing logical storage entities included in an existing data storage system configuration. Since, in this example, writes directed to LUNs 110a, 110b may be received for processing by either of the nodes 102a and 102b, the example 100 illustrates what may also be referred to as an active-active configuration.

In connection with a write operation as may be received from a host and processed by processor node A 102a, the write data may be written to the system cache 104b, marked as write pending (WP) denoting it needs to be written to physical storage 110a, 110b and, at a later point in time, the write data may be destaged or flushed from the system cache to the physical storage 110a, 110b by the BE component 104c. The write request may be considered complete once the write data has been stored in the system cache whereby an acknowledgement regarding the completion may be returned the host (e.g., by component 104a). At various points in time, WP data stored in the system cache is flushed or written out to physical storage 110a, 110b. In connection with inline processing layer 105a, prior to storing the original data on physical storage 110a, 110b, compression and data deduplication processing may be performed that converts the original data (as stored in the system cache prior to inline processing) to a resulting form (that may include compressed and/or deduplicated portions) which is then written to physical storage 110a, 110b. In at least one embodiment, when deduplication processing determines that a portion (such as a chunk) of the original data is a duplicate of an existing data portion already stored on 110a, 110b, that particular portion of the original data is not stored in a compressed form and may rather be stored in its deduplicated form (e.g., there is no need for compression of a chunk determined to be duplicate of another existing chunk). If the original data portion is not a duplicate of an existing portion already stored on 110a, 110b, the original data portion may be compressed and stored in its compressed form on 110a, 110b.

In connection with a read operation to read a chunk of data, a determination is made as to whether the requested read data chunk is stored in its original form (in system cache 104b or on physical storage 110a, 110b), or whether the requested read data chunk was previously deduplicated or compressed. If the requested read data chunk (which is stored in its original decompressed, non-deduplicated form) is in system cache, the read data chunk is retrieved from the system cache 104b and returned to the host. Otherwise, if the requested read data chunk is not in system cache 104b but is stored on physical storage 110a, 110b in its original form, the requested data chunk is read by the BE component 104c from the backend storage 110a, 110b, stored in the system cache and then returned to the host.

If the requested read data chunk was previously deduplicated, the read data chunk is recreated and stored in the system cache in its original form so that it can be returned to the host. If the requested read data chunk was previously compressed, the chunk is first decompressed prior to sending the read data chunk to the host. If the compressed read data chunk is already stored in the system cache, the data is uncompressed to a temporary or buffer location, the uncompressed data is sent to the host, and the buffer or temporary location is released. If the compressed read data chunk is not in system cache but stored on physical storage 110a, 110b, the compressed read data chunk may be read from physical storage 110a, 110b into system cache, uncompressed to a buffer or temporary location, and then returned to the host. Thus, requested read data stored on physical storage 110a, 110b may be stored in a deduplicated or compressed form as noted above where processing is performed by 105a to restore or convert the deduplicated or compressed form of the data to its original data form prior to returning the requested read data to the host.

In connection with techniques herein, each processor or CPU may include its own private dedicated CPU cache (also sometimes referred to as processor cache) that is not shared with other processors. In at least one embodiment, the CPU cache, as in general with cache memory, may be a form of fast memory (relatively faster than main memory which may be a form of RAM). In at least one embodiment, the CPU or processor cache is on the same die or chip as the processor and typically, like cache memory in general, is far more expensive to produce than normal RAM such as may be used as main memory. Processor cache is substantially faster than the system RAM such as used as main memory and contains information that the processor will be immediately and repeatedly accessing. The faster memory of the CPU cache may, for example, run at a refresh rate that's closer to the CPU's clock speed, which minimizes wasted cycles. In at least one embodiment, there may be two or more levels (e.g., L1, L2 and L3) of cache. The CPU or processor cache may include at least an L1 level cache that is the local or private CPU cache dedicated for use only by that particular processor. The two or more levels of cache in a system may also include at least one other level of cache (LLC or lower level cache) that is shared among the different CPUs. The L1 level cache serving as the dedicated CPU cache of a processor may be the closest of all cache levels (e.g., L1-L3) to the processor which stores copies of the data from frequently used main memory locations. Thus, the system cache as described herein may include the CPU cache (e.g., the L1 level cache or dedicated private CPU/processor cache) as well as other cache levels (e.g., the LLC) as described herein. Portions of the LLC may be used, for example, to initially cache write data which is then flushed to the backend physical storage.

When the processor performs processing, such as in connection with inline processing 105a, 105b as noted above, data may be loaded from main memory and/or other lower cache levels into its CPU cache. In particular, inline compression (ILC) and inline data deduplication (ILD) may be performed as part of inline processing 105a, 105b.

Compression processing such as performed by ILC threads is generally a CPU intensive operation. However, as discussed in more detail herein, there is a relationship between entropy and data compression where a computed entropy value for a data chunk may denote a measure or degree of compressibility of the data chunk. Generally, computation of an entropy value for a data chunk may be characterized as lightweight in terms of CPU requirements as opposed to performing compression processing for the data chunk. In an embodiment in accordance with techniques herein, the computed entropy value for a data chunk may be used in determining whether or not to proceed with compressing the data chunk. The foregoing is generally more CPU efficient than actually compressing each data chunk in order to determine whether or not it (the data chunk) is compressible (and should therefore be stored in its compressed form), or otherwise achieves at least a minimum amount of data reduction (e.g., whether or not a compressed form of a data chunk has a reduced size that is less than the size of the original data chunk by at least a threshold amount) to warrant storing the chunk in its compressed form.

Information entropy may be characterized as the average rate at which information is produced by a stochastic source of data. The definition of entropy used in information theory is analogous to the definition used in statistical thermodynamics. The concept of information entropy was introduced by Claude Shannon in "A Mathematical Theory of Communication", The Bell System Technical Journal (Volume: 27, Issue: 3, July 1948; pages 379-423). The measure of information entropy associated with each possible data value may be expressed as the negative logarithm of the probability mass function for the value. When the data source has a lower-probability value (i.e., when a low-probability event occurs), the event carries more "information" ("surprisal") than when the source data has a higher-probability value. The amount of information conveyed by each event defined in this way becomes a random variable whose expected value is the information entropy. Generally, entropy refers to disorder or non-uniformity. As a metric, an entropy value denotes a measure of the randomness of data, or a random distribution of symbols.

The relationship between entropy and compressibility is discussed, for example, in "Relationship Between Entropy and Test Data Compression", Kedarnath J. Balakrishnan and Nur A. Touba, IEEE Transactions on Computer-Aided Design of Integrated Circuits and Systems, Vol. 26, No. 2, February 2007, pages 386-395, and "Entropy and Compressibility of Symbol Sequences", Werner Ebeling, PhysComp96 (Physics and Computation 1996), Feb. 23, 1997, both of which are incorporated by reference herein. As explained in "Relationship between Entropy and Test Data Compression", entropy of a data set is a measure of the amount of information in the data set. Entropy calculations for fully specified data have been used to get a theoretical bound on how much the data can be compressed. In "Relationship between Entropy and Test Data Compression", the concept of entropy is extended for incompletely specified test data that has unspecified or don't care bits. "Entropy and Compressibility of Symbol Sequences" investigates long-range correlations in symbol sequences using methods of statistical physic and non-linear dynamics.

Entropy, H, with respect to a data set may be expressed as:

$$H = -\sum_{i=0}^{N-1} P_i \log_2(P_i) \quad \text{EQUATION 1}$$

Where
$P_i$ is the probability of occurrence of symbol $X_i$ in the data set;
N is the total number of unique symbols; and
$\log_2$ is the base 2 logarithm.

Generally, entropy for the data set depends on the symbol length L. Assume the data set is partitioned into sections where each section includes L bits of data. Thus L denotes number of bits in each section and L also denotes the length of the symbol. For a given symbol length, entropy for the data may be calculated to provide a value that denotes an expected or predicted level of compressibility for the data. Note that $P_i$, the probability of symbol $X_i$, refers to the actual frequency of the symbol $X_i$ in the data set. Thus, $P_i$ for $X_i$ may be calculated as the frequency or number of times $X_i$ appears in the data set divided by the total number of sections in the data set.

It should be noted, although particular values are selected for purposes of illustration, generally the entropy value used with techniques herein may be included for any size data chunk or data set that may include symbols of any suitable number of bits (e.g., any symbol length) having any number of unique symbols.

In at least one embodiment in accordance with techniques herein, L may be 8 where each symbol may include 8 bits (e.g., have a symbol length of 8). In such an embodiment, each symbol or bit pattern of 8 bits denotes a byte of information having a numerical data value (base 10) in the range from 0 to 255, inclusively. In such an embodiment, N, the number of unique symbols (e.g., numerical value of bit patterns) is 256, and EQUATION 1 for calculating entropy, H, may be expressed as:

$$H = -\sum_{i=0}^{255} P_i \log_2(P_i) \quad \text{EQUATION 2}$$

The entropy values calculated using EQUATION 1 and EQUATION 2 are (e.g., real numbers) within the inclusive range of 0 to 8, where 0 denotes the maximum expected level of compressibility of the data set and 8 denotes the minimum expected level of compressibility of the data set. For a given data set, the larger the entropy value (e.g., closer to 8), the more random the data and the less compressible the data set; and the smaller or lower the entropy value (e.g., close to 0), the more uniform the data and the more compressible the data set.

In at least one embodiment, an entropy value may be determined for each 8 KB (kilobyte) chunk of a data set. Thus, each 8 KB chunk includes 8192 bytes (e.g., 8*1024). Generally, the data set may be any defined set of stored data such as, for example, a database, one or more selected portions or logical address space portions of a database, data used by a particular application stored on one or more LUNs, selected portions of one or more LUNs, one or more files, one or more directories, one or more file systems, particular portions of one or more directories or file systems, and the like.

Figure 3:
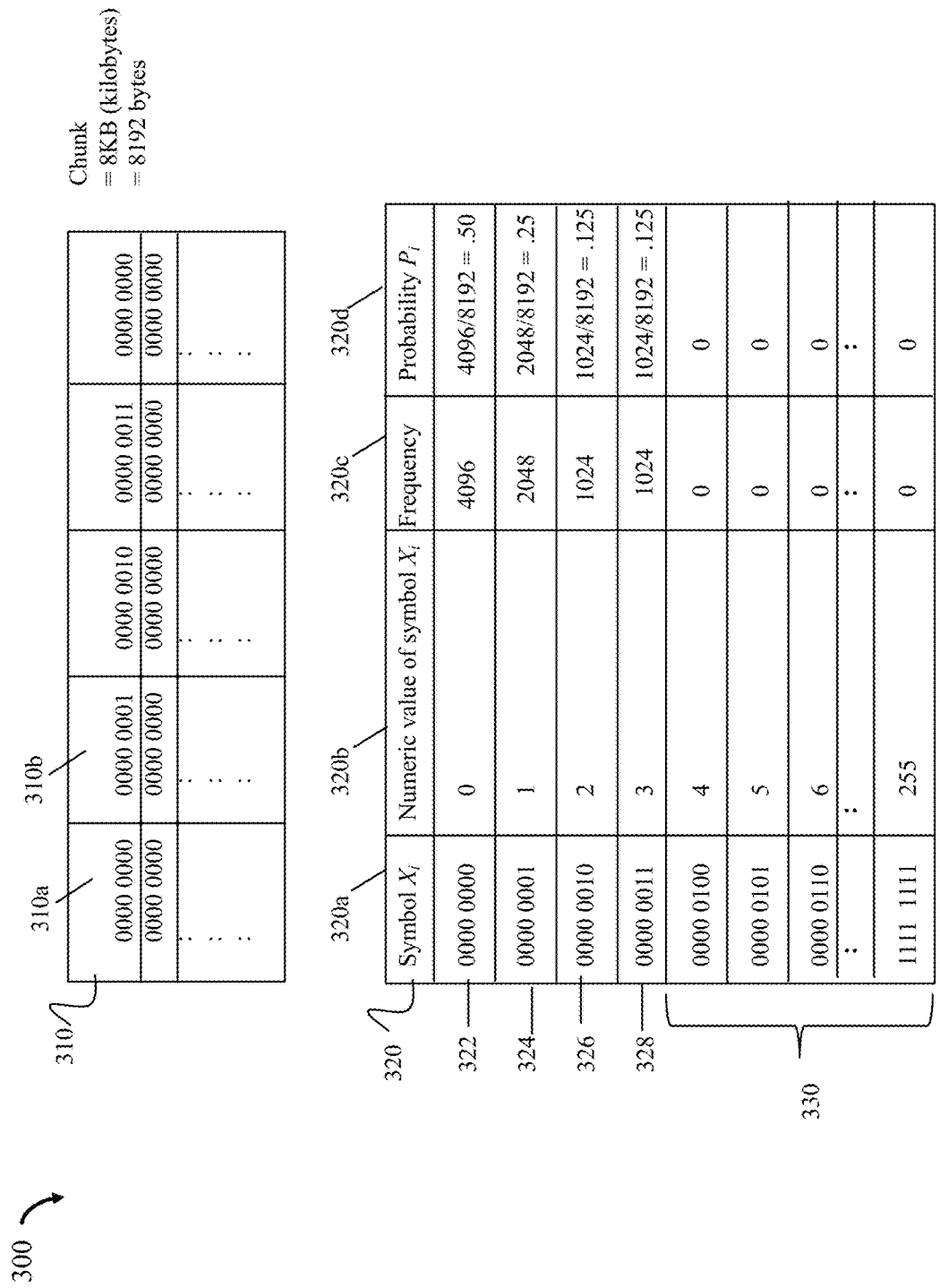
FIG. 3 is an example illustrating a data chunk and associated information that may be used in connection with calculating an entropy value for the data chunk an embodiment in accordance with techniques herein.

Referring to FIG. 3, shown is an example 300 illustrating a data chunk and associated information that may be used in an embodiment in accordance with techniques herein. The example 300 includes data chunk 310 having a size of 8 KB. The data chunk 310 may be partitioned into bytes or 8 bit segments where each byte denotes a symbol having a numeric value from 0 to 255, inclusively. For example, element 310a denotes a byte or symbol having a value of 0 and element 310b denotes a byte or symbol having a value of 1. To calculate the entropy for chunk 310, information in table 320 may be determined. Table 320 includes the following columns: symbol $X_i$ 320a, numeric value of symbol $X_i$ 320b, frequency of $X_i$ 320c and probability $P_i$. Each row of 320 includes a set of information for each unique symbol that can occur in the chunk. Thus, table 320 may include 256 rows, one row for each of the unique symbols having corresponding numeric values from 0 to 255, inclusively. Row 322 denotes that the numeric value 0 for symbol "0000 0000" has a frequency of 4096 and a probability $P_i$=0.50. Row 324 denotes that the numeric value 1 for symbol "0000 0001" has a frequency of 2048 and a probability $P_i$=0.25. Row 326 denotes that the numeric value 2 for symbol "0000 0010" has a frequency of 1024 and a probability $P_i$=0.125. Row 328 denotes that the numeric value 3 for symbol "0000 0011" has a frequency of 1024 and a probability $P_i$=0.125. Element 330 indicates that the remaining symbols each have a frequency=0 and thus a probability $P_i$=0. Based on EQUATION 2 and using the information from table 320 for the chunk 310, the calculated entropy value for chunk 310 is 1.75. Based on the range of possible entropy values from 0 to 8, inclusively, an embodiment may use the entropy value of 1.75 to determine whether or not to compress the chunk 310. For example, consistent with discussion herein, an embodiment may perform the entropy calculation for the chunk 310 inline as part of ILC processing of the I/O or data path, when writing or storing chunk 310 to PDs such as illustrated and described in connection with FIG. 2B. Based on the calculated entropy value for the chunk such as may be performed as part of ILC processing, an embodiment may determine whether to perform compression of the chunk inline as part of the I/O or data path.

In at least one embodiment, an entropy threshold may be specified where compression, such as part of ILC, may be performed for chunks having an entropy value less than the threshold. Otherwise, the chunk may not be compressed, such as in connection with ILC processing. Thus, the threshold denotes a maximum allowable entropy level in order for ILC to compress the chunk. Generally, any suitable value for the threshold may be selected. For example, in at least one embodiment, the threshold may be a value within the range of 5.0 to 6.0, inclusively.

Figure 4:
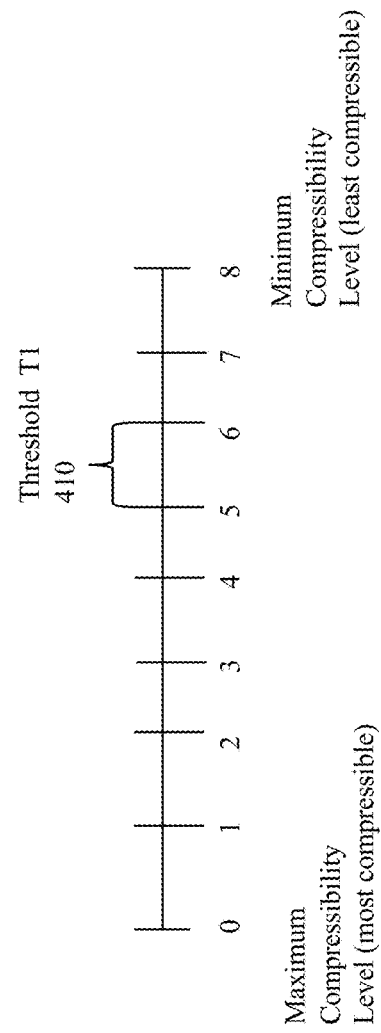
FIG. 4 is an example illustrating selection of an entropy threshold used in an embodiment in accordance with techniques herein.

Reference is made to FIG. 4 illustrating a threshold range within which a threshold for may be selected for use in an embodiment in accordance with techniques herein. The example 400 illustrates the possible range of entropy values from 0 to 8, inclusively where element 410 denotes that the entropy threshold Ti may be a value (e.g., real number) selected within the range of 5.0 to 6.0, inclusively. For example, assume Ti is selected as 6.0 whereby chunks have associated entropy values within the range 0 to 6.0, inclusively, are compressed. With reference to the example described above in connection with FIG. 3 for chunk 310 having an entropy value of 1.75, it may be determined to compress the chunk 310 inline (e.g., to perform compression processing of the chunk such as part of ILC processing).

As noted above, compression processing such as performed by ILC threads is generally a CPU intensive operation. As also described above, since a computed entropy value for a data chunk may denote a measure or degree of compressibility of the data chunk, such an entropy value may be used in determining whether or not the chunk is compressible, or more generally whether the compressed form of the chunk is expected to achieve at least a minimum amount of data reduction to warrant storing the chunk in its compressed form and incurring additional costs associated with such (e.g., additional CPU processing to decompress the chunk when reading the chunk from physical storage where the compressed form of the chunk is stored). Thus, as discussed above, the entropy value for a data chunk may be used in determining whether or not to actually proceed with compressing the data chunk. In at least one embodiment, after a chunk is compressed based on its entropy value being below a specified entropy threshold, the size of the compressed form of the chunk may be compared to the size of the original or uncompressed form of the chunk (e.g., provided as an input to compression processing) to determine whether at least a threshold amount or rate of data reduction has been achieved.

In at least one embodiment, a determination of whether a chunk of a data set is compressible (and therefore stored in its compressed form) or uncompressible (and therefore stored in uncompressed form) may be made in connection with an entropy value determined for the chunk or the amount or rate of data size reduction achieved as a result of compressing the chunk (e.g., comparison of original chunk size to the resulting size of compressed form of the chunk generated as an output of actual compression of the chunk, such as based on a compression ratio). For example, a chunk may be determined as uncompressible if its associated entropy value is greater than a specified entropy threshold as discussed above. In this case, the chunk may be stored in its uncompressed original form. As another example, a chunk may be determined as uncompressible if the chunk's entropy value is below a specified minimum entropy threshold but the compressed form of the chunk does not result in at least a specified amount or rate of data reduction when the size of the compressed chunk is compared to the original uncompressed size of the chunk input to compression processing. Thus, in this latter example, the chunk is actually compressed a first time but a determination is made that the chunk is uncompressible since the output of compression processing does not generate a compressed form of the chunk which is at least a specified rate or amount smaller than the original chunk. For example, in at least one embodiment, a minimum threshold in terms of compression ratio such as a percentage, N % (N being a positive integer), may be specified denoting the compressed form of a chunk must result in at least an N % reduction in size of the original uncompressed form of the chunk in order for the chunk to be characterized compressible and in order for the chunk to be stored in its compressed form.

Figure 5:
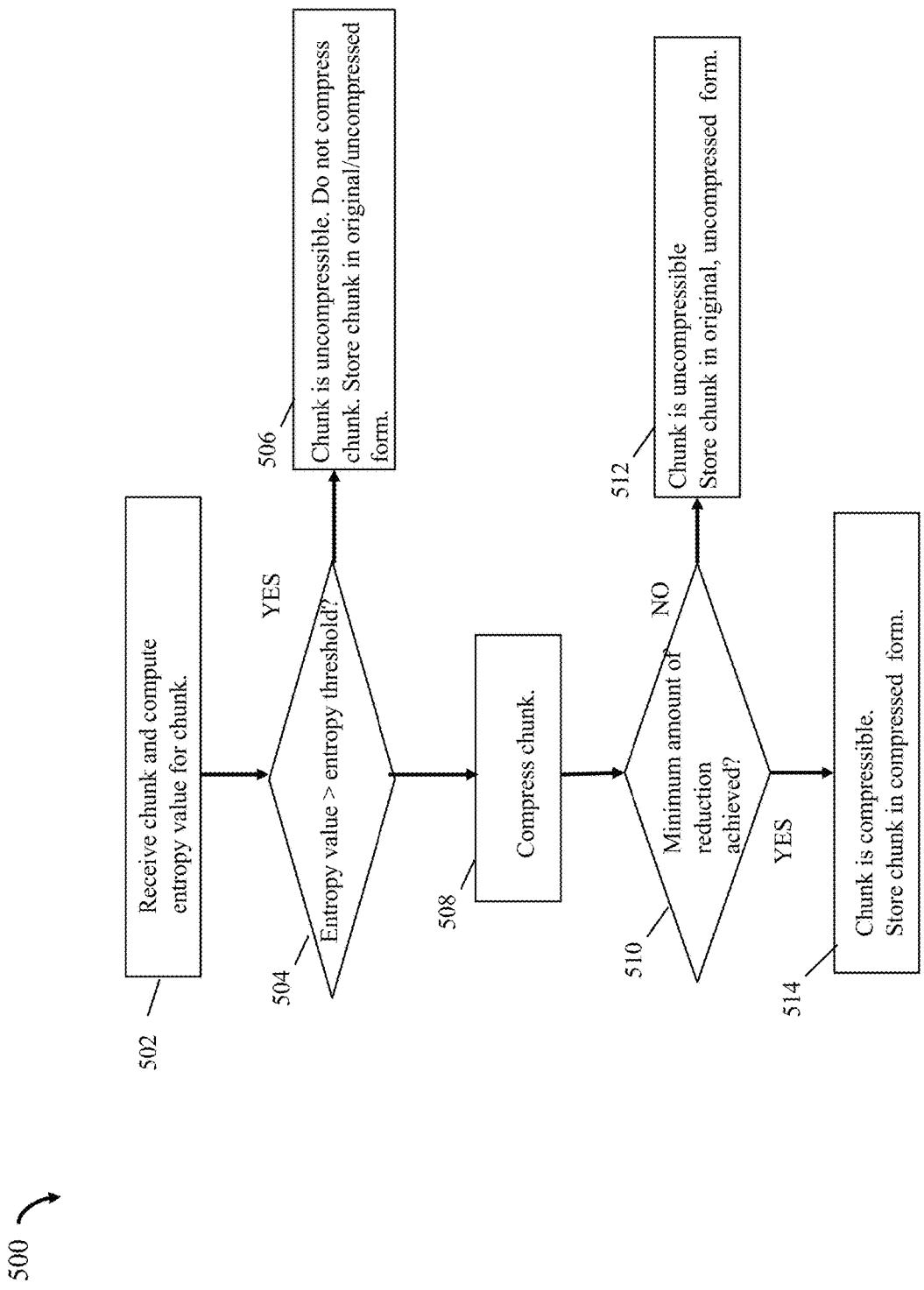
FIGS. 5, 7B and 8B are flowcharts of processing steps that may be performed in an embodiment in accordance with techniques herein.

Referring to FIG. 5, shown is a flowchart of processing steps that may be performed in an embodiment in accordance with techniques herein. The flowchart 500 summarizes processing discussed above that may be performed in an embodiment in accordance with techniques herein. At step 502, a chunk is received and the entropy value for the chunk may be computed. From step 502, processing proceeds to step 504 where a determination is made as to whether the entropy value for the chunk is greater than the specified entropy threshold. If step 504 evaluates to yes, control proceeds to step 506. In step 506, the chunk is determined to be uncompressible based on its entropy value. Accordingly, the chunk is not compressed and the chunk is stored in its original, uncompressed form. If step 504 evaluates to no, control proceeds to step 508 where the chunk is compressed. From step 508, control proceeds to step 510. At step 510, a determination may be made as to whether at least a minimum amount or rate of data reduction (e.g., size of original uncompressed chunk as compared to size of compressed chunk) is achieved by compressing the chunk. If step 510 evaluates to no, control proceeds to step 512 where the chunk is characterized as uncompressible and is stored in its original uncompressed form. Otherwise, if step 510 evaluates to yes, control proceeds to step 514 where the chunk is characterized as compressible and stored in its compressed form.

Consistent with other discussion herein, it should be noted that the processing of the flowchart of FIG. 5 may be performed as part of inline processing of the I/O or data path, such as ILC, or may alternatively be performed in connection with a data set offline (e.g., not as part of the I/O or data path when servicing received I/O operations, such as write operations), such as with respect to a data set after the chunks have been written to the data set.

In at least some existing system performing compression, compression may be performed at the same single compression size granularity such as 4 KB or 8 KB. The compression size granularity may be referred to as the unit or chunk size of data for which compression is performed. For example, in at least one existing system, compression may be performed for each chunk that is a single block having a 4 KB block size. However, as determined by the inventors through experimentation discussed below, applying compression to such small chunks (e.g., at a single 4 KB block granularity) may not be space efficient. The inventors performed experiments using different compression size granularities and determined that greater space efficiency or greater compression rates may be obtained as compression is applied using larger compression size granularities. Such increasing compression rates may be achieved as the compression size granularity increases, up to a point where the compression rate or compression space savings begins to level off.

Figure 6A:
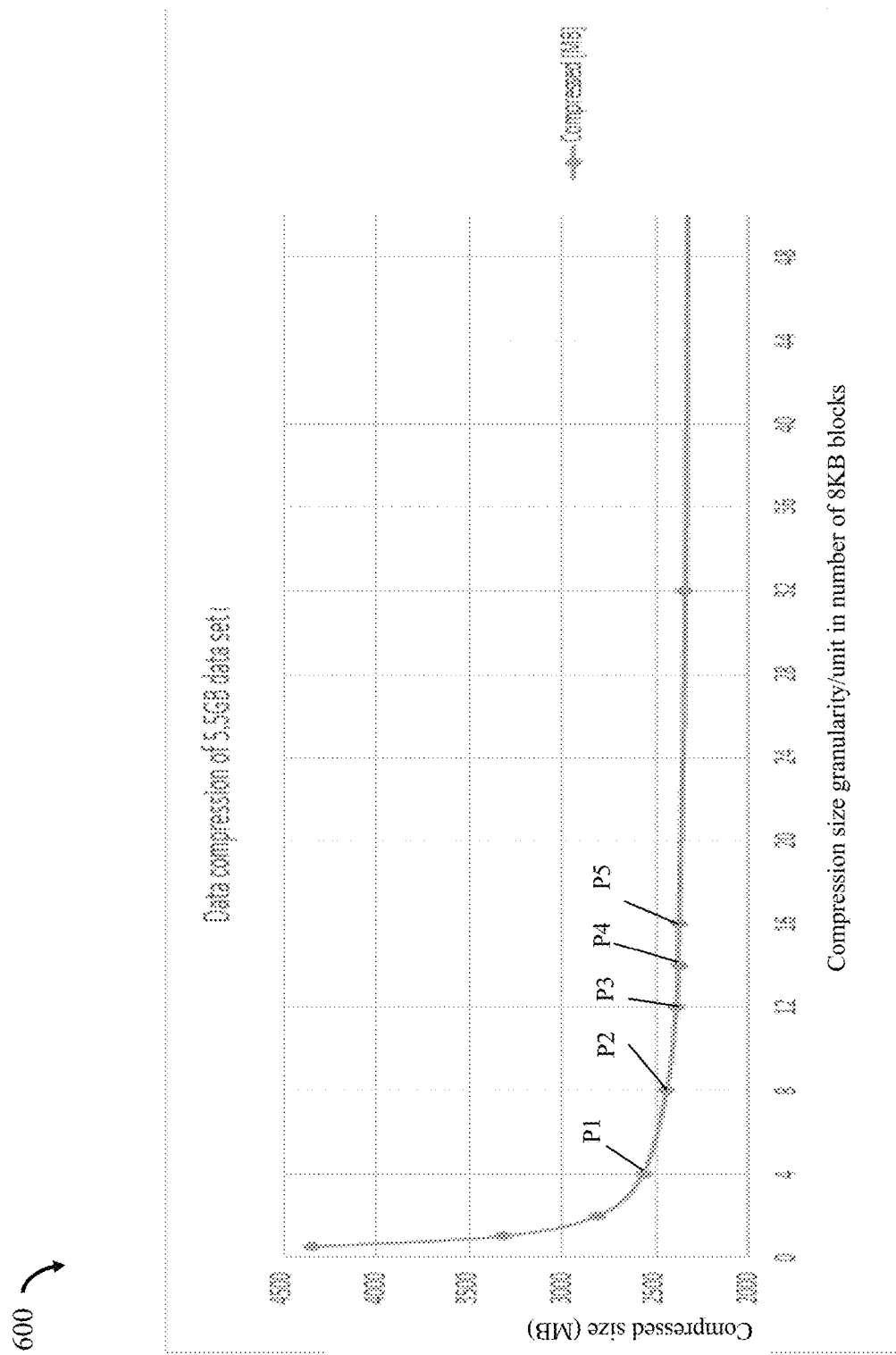
FIGS. 6A and 6B are graphical illustrations using different compression unit sizes or granularities.

Referring to FIG. 6A, shown is a graph illustrating compressed sizes achieved for a data set when different compression chunk sizes, or various compression size granularities are used on a data set that is 5.5 GB in size in its original uncompressed form. The graph 600 illustrates different compression size granularities on the X axis and the resulting compressed size in MBs on the Y axis. The compression size granularities on the X axis are integer values denoting a number of 8 KB blocks specified as the size of the compression unit or compression granularity. For example, an X value of 4 means that the data set is partitioned into chunks having a size of 4 blocks where compression is performed with respect to each 4 block chunk or unit (e.g., each block being 8 KB in size means that the compression size granularity or chunk of 4 blocks is 32 KB). The inventors obtained the results illustrated in the graph 600 through experimentation using different compression size granularities for the same 5.5 GB data set. As can be seen from the graph 600 as illustrated by point P1, the compression savings achieved using a compression granularity size of 4, 8 KB blocks, is about 21%. If a compression granularity size of 8, 8 KB blocks is used as denoted by point P2, the size reduction or space savings achieved via compression is about 40%. If a compression granularity size of 12, 8 KB blocks is used as denoted by point P3, the size reduction or space savings achieved via compression is about 58%. As also illustrated by the graph 600, using a compression granularity size greater than 12, 8 KB blocks does not generally result in achieving much larger reductions or rates in compression. As can be seen from the graph 600, the curve tends to level out when using a compression granularity size greater than 12, 8 KB blocks.

Figure 6B:
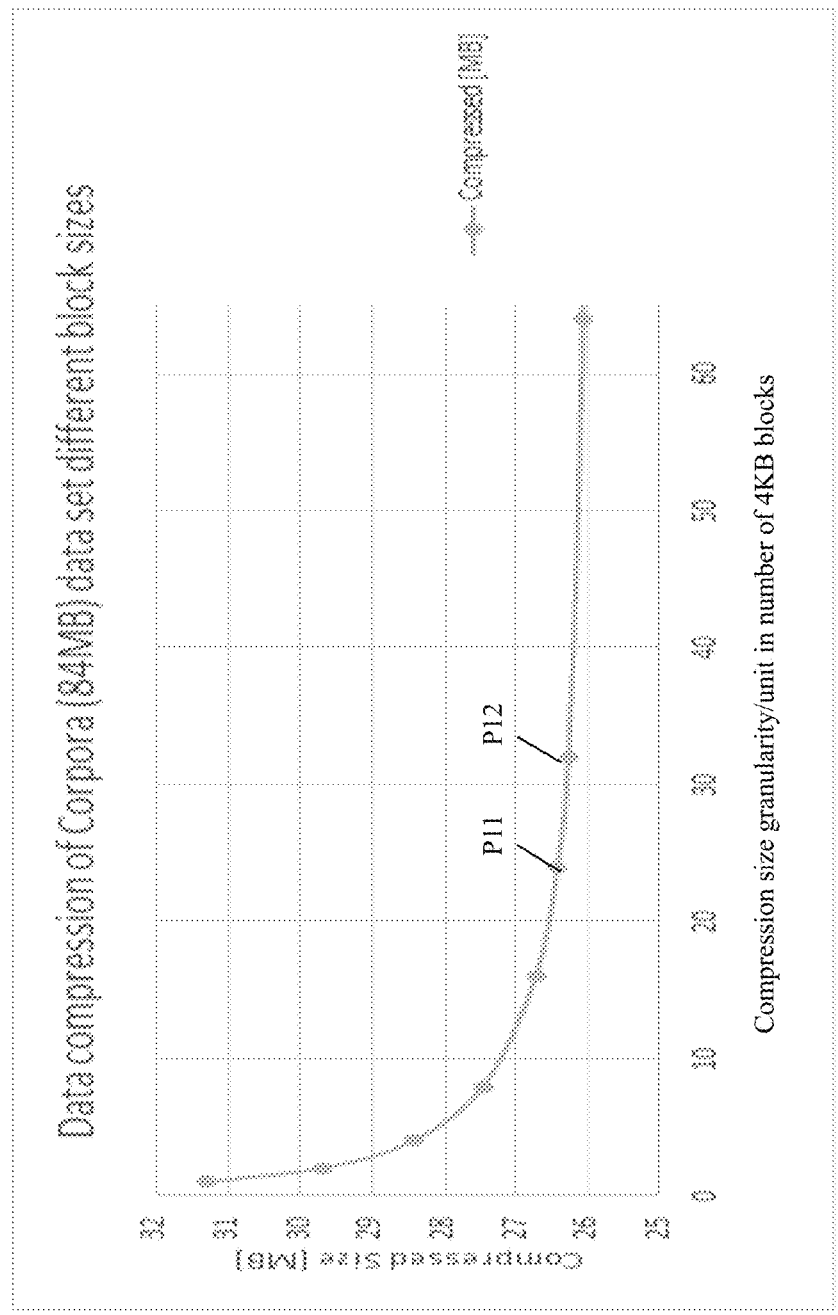

Referring to FIG. 6B, shown is a graph illustrating compressed sizes achieved for a data set when different compression chunk sizes, or various compression size granularities are used on a second data set that is 84 MB in size in its original uncompressed form. The graph 650 illustrates different compression size granularities on the X axis and the resulting compressed size in MBs on the Y axis. The compression size granularities on the X axis are integer values denoting a number of 4 KB blocks specified as the size of the compression unit or compression granularity. For example, an X value of 4 means that the data set is partitioned into chunks having a size of 4 blocks where compression is performed with respect to each 4 block chunk or unit (e.g., each block being 4 KB in size means that the compression size granularity or chunk of 4 blocks is 16 KB). The inventors obtained the results illustrated in the graph 650 through experimentation using different compression size granularities for the same 84 MB data set. In FIG. 6B, the leveling off of the curve occurs approximately between points P11 and P12, respectively, corresponding to a compression granularities or unit sizes of 24 blocks (e.g., 24*4=96 KB) and 32 blocks (e.g., 32*4=128 KB).

Thus, increasing the compression granularity size or amount of data compressed as a single unit, up to a particular point such as denoted by P3 in FIG. 6A and denoted by P11 and P12 of FIG. 6B, clearly results in increased compression rates and storage savings benefit. However, there is a cost incurred when compressing at larger compression granularities (which obtain the increased compression rate benefit). One additional cost or overhead incurred when using larger compression granularities results in connection with the additional costs associated with a read miss. When requested read data is not stored in cache thereby resulting in a read miss, the requested read data is read from physical storage thereby resulting in additional costs incurred to access the compressed read data from physical storage media and then decompress the read data to be returned to the requesting host or other client. For larger compression granularities, each unit or chunk of data that may be the subject of such read miss processing as just described is also larger and thereby further increases the costs incurred in connection with the read miss processing. Thus, consistent with techniques described in following paragraphs, an embodiment in accordance with techniques herein may take into account cost penalties as well as such additional benefits obtained for increased sizes of the compress granularity size.

Described in following paragraphs are techniques that provide for using a variable size compression granularity, unit or chunk of data compressed as a single unit. Thus, for example rather than have an entire data set or all compressed data stored in the data storage system be compressed in the same compression unit size, such as 4 KB or 8 KB, techniques herein provide for varying the size of the compression granularity, unit or chunk compressed as a single unit. In at least one embodiment, different compression unit sizes may be used for different portions of the same data set. An embodiment in accordance with the techniques herein may use the entropy metric, such as described elsewhere herein (e.g., EQUATIONS 1 and 2), to select the number of blocks (e.g., size or amount of data) to compress in a single unit. Furthermore, such as based on experimental results as illustrated in FIGS. 6A and 6B, an embodiment may consider the additional benefit or space savings obtained, if any, with compressing a first larger amount of data vs. a second lesser amount of data in a single chunk to decide whether to compress, as a single unit, the first larger amount of data or the second lesser amount of data. For example, consistent with FIG. 6A, an embodiment using an 8 KB block size may decide to not compress more than 12 blocks (e.g., 96 KB) as a single chunk or unit and may utilize entropy values to select a compression unit size from 1 block up to a maximum size of 12 blocks. For example, consistent with FIG. 6B, an embodiment using an 4 KB block size may decide to not compress more than 24 blocks (e.g., 96 KB) or 32 blocks (e.g., 128 KB) as a single chunk or unit and may utilize entropy values to select a compression unit size from 1 block up to the specified maximum size of 24 blocks or 32 blocks.

Examples described herein may use particular block sizes, such as 8 KB or 4 KB, to illustrate use of techniques herein. However, more generally, an embodiment in accordance with techniques herein may use any suitable block size. Generally, techniques described in following paragraphs may be used in connection with data blocks that are written and processed using techniques herein as part of inline processing, such as part of ILC processing, in the I/O or data path. Alternatively, techniques herein may also be performed offline (e.g., not as part of ILC processing of the I/O or data path) on an existing data set stored on physical storage.

What will now be described is a first embodiment illustrating use of techniques herein in which entropy, and thus estimated compressed size and/or compression ratios, may be used in determining and selecting how many blocks to compress as a single unit. For this example for purposes of illustration, assume there is an existing data set stored on physical storage and processing is performed to compress the data set using techniques herein with variable compression unit sizes and using entropy, and thus estimated compressed size and/or compression ratios, to determine the variable compression unit sizes. In this first embodiment and example, assume use of a 4 KB block size. In this example, blocks of the data set may be processed in logical sequential order based on the logical address space of the data set. Generally, processing of this first embodiment assesses the additional benefit of increasing the compression unit size by adding one block at a time. An evaluation is made as to whether adding each additional block to the compression unit results in a sufficient benefit to warrant adding that block thereby increasing the compression unit size. The sufficient benefit or gain may be made, for example, by a comparison between a first estimated space savings benefit or a first estimated compression ratio using the proposed compression unit with the additional block, and a second estimated space savings benefit or a second estimated compression ratio using a compression unit without the additional block. As described below, such evaluation may be made using cumulative counters or frequencies maintained in a table, such as table 320 of FIG. 3.

Figure 7A:
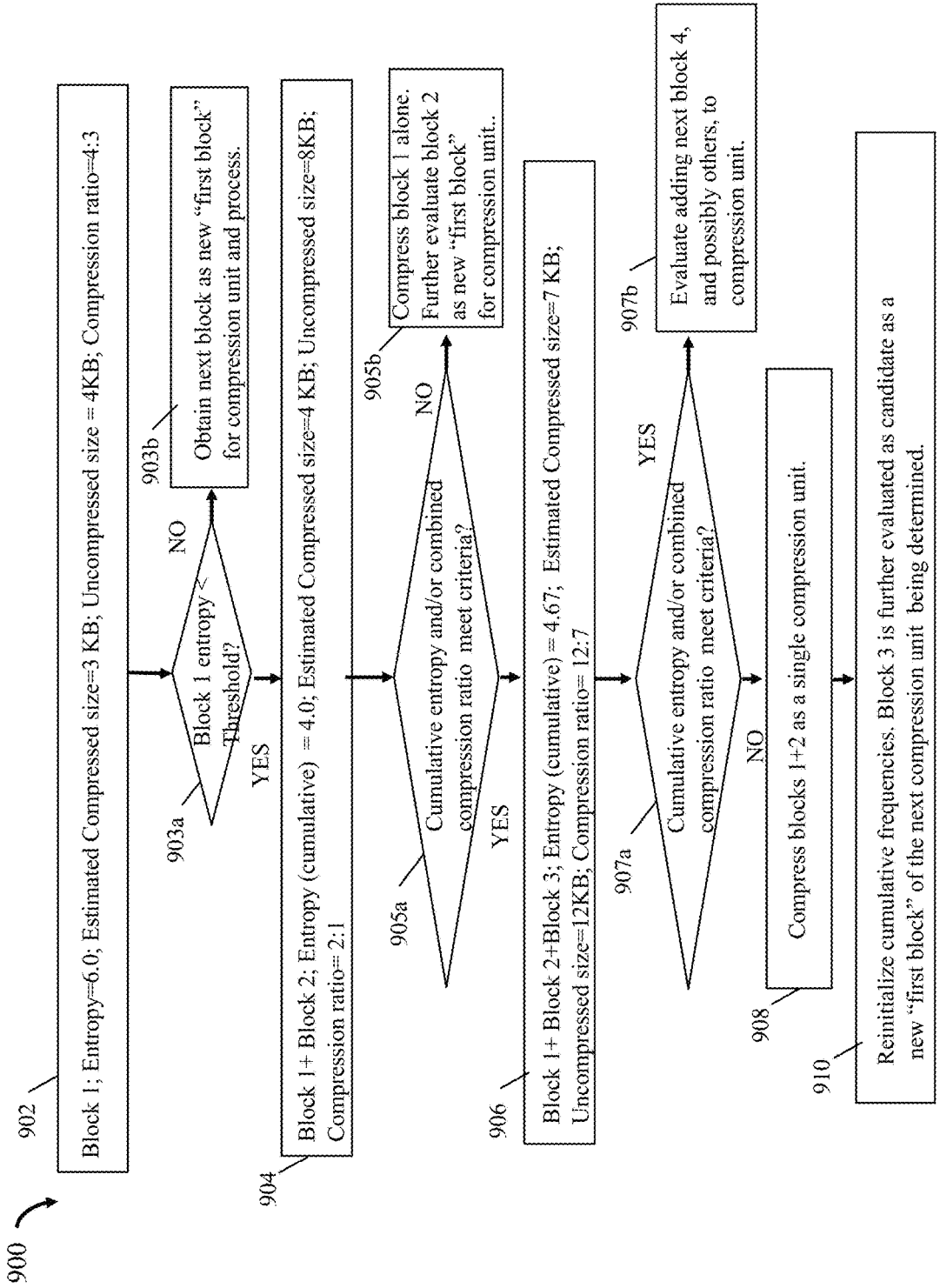
FIGS. 7A and 8A are examples illustrating use of techniques herein in various embodiments.

With reference to FIG. 7A, at step 902, block 1 of the data set is received and its entropy value calculated such as using EQUATION 2 and as generally described herein, such as in connection with FIG. 3. In this example, it is assumed that a table of counters or frequencies such as illustrated by table 320 of FIG. 3 is maintained during processing when counting the frequencies of the different byte symbols 320a or numeric values 320b of such symbols. Using the frequencies and probabilities such as in table 320, the entropy value for block 1 may be calculated consistent with EQUATION 2. In this example, block 1 may have an entropy value of 6. Block 1 in this example is a first proposed block for inclusion in a compression unit. For block 1 to be included as the first block of the compression unit, block 1's entropy value may be required to be smaller than a specified entropy threshold, such as determined in step 903a The entropy threshold may be a selected value as described elsewhere herein. In this example, assume the entropy threshold is 6.5 whereby block 1's entropy value of 6.0 is less than the current entropy threshold and step 903a evaluates to yes or true. As an aside, if block 1's entropy value is not less than the entropy threshold where step 903a evaluates to no or false, then processing may assume block 1 is not compressible and may continue processing in step 903b with the next sequential block of the data set as a first proposed block for inclusion in a single compression unit to be compressed. More complete processing performed such as in connection with step 903b is described in more detail elsewhere herein (e.g., such as in connection with FIG. 7B).

The estimated compressed size of a block X, or more generally any data chunk X, may be determined using the block's entropy value as expressed using EQUATION 3 below:

$$\text{Estimated compressed size}(X) = (\text{Entropy}(X)/8) * \text{number of bytes in } X \quad \text{EQUATION 3}$$

Where
X is the block or data chunk;
Entropy (X) is the computed entropy value for X, such as in accordance with EQUATION 2 and FIG. 3; and
number of bytes in X is the number of bytes in the block or chunk X.

For example, with a 4 KB or 4096 byte block size and an entropy=6.0 for block 1, block 1's estimated compressed size is 3 KB resulting in a compression ratio of 4:3 (e.g., compression ratio=uncompressed size/compressed size). In this example, it is assumed that a table of counters or frequencies such as illustrated by table 320 of FIG. 3 is maintained during processing. Thus, at the end of step 902, the table 320 may include counter or frequency values in 320c based on those counts of the different byte patterns 320a or numeric values of such byte patterns 320b in block 1.

After step 903a, processing now attempts to increase the compression unit size to 2 blocks by evaluating whether sufficient benefit in compression or storage savings is obtained by increasing the compression unit from block 1 to include blocks 1 and 2, combined.

With reference to FIG. 7A, from step 903a, control proceeds to step 904. At step 904, block 2 of the data set is received and its entropy value calculated such as using EQUATION 2 and as generally described herein. In this example, it is assumed that counters or frequencies 320c such as illustrated by table 320 of FIG. 3 are maintained as a cumulative set of counters or frequencies during processing when counting the frequencies of the different byte symbols 320a or numeric values 320b of such symbols in each block being added, or evaluated for addition to the compression unit. Thus, processing of 904 includes counting the frequency of each occurrence of the different symbols 320a or numeric values 320b of such symbols and adding the counts determined for block 2 to those existing frequencies 320c in the table from block 1. In this manner, the frequency or counter values 320c denote the cumulative, total or aggregate occurrence of each of the symbols 320a or numeric values 320b across the proposed compression unit of aggregated/combined blocks 1 and 2. Using such cumulative frequencies of 320c for the aggregated blocks 1 and 2, associated probabilities 320d may be calculated and used to determine a cumulative entropy value for the proposed compression unit including both blocks 1 and 2. In this example as denoted by 904, assume the cumulative entropy value for blocks 1 and 2 is 4.0 whereby the estimated compressed size for blocks 1 and 2 (e.g., using EQUATION 3) is 4 KB, and whereby the estimated compression ratio is 2:1. From step 904, control proceeds to step 905a. In step 905a in accordance with specified criteria, the cumulative entropy value of 4.0 and/or the estimated compression ratio of 2:1 of 904 may be compared, respectively, to the entropy value of 6.0 and/or the estimated compression ratio of 4:3 from 902 to evaluate whether there is sufficient benefit (e.g., in terms of space savings or increased compression rate) to compress just block 1 alone, or whether to compress blocks 1 and 2 combined as a single compression unit. In this example in connection with step 905a, such comparisons using such criteria may determine that, due to the entropy value of 4.0 from step 904 being smaller than the entropy value 6.0 from step 902, and also due to the compression ratio of 2:1 of step 904 being an improved or better compression ratio (increased compression ratio and space savings) than 4:3 from step 902, there is sufficient additional benefit to add block 2 to the compression unit whereby at least blocks 1 and 2 are compressed as a single unit. As a result, step 905a evaluates to yes or true and control proceeds to step 906.

As an aside, step 905a may evaluate to no or false wherein processing may alternatively determine not to combine both blocks 1 and 2 in the same compression unit if, for example, the compression ratio of 902 is not less than the compression ratio of 902 (e.g., by at least a specified amount) or if the entropy value of 904 is not smaller than the entropy value of 902 (e.g., by at least a specified amount). In this alternative case, control proceeds from step 905a to 905b where block 1 may be compressed alone (without block 2) if its entropy value is less than the specified threshold. Additionally, although the combination of blocks 1 and 2 are not compressed as a unit in step 905b, further processing may be performed as part of step 905b to consider block 2. In step 905b, block 2 may now be further evaluated and considered as a new first block of a compression unit in a manner similar to block 1 in step 902. In other words, block 2 may be compressed alone, or possibly in combination with one or more other subsequent sequentially stored blocks such as blocks 3, 4 and the like. Processing of step 905b is described in more detail elsewhere herein, such as in connection with FIG. 7B.

Continuing with our example 900, at the end of step 905a evaluating to yes or true, processing determines that the current compression unit includes at least blocks 1 and 2. Processing continues from step 905a to 906. At step 906, block 3 of the data set is received and its entropy value calculated such as using EQUATION 2 and as generally described herein. In this example, it is assumed that counters or frequencies 320c such as illustrated by table 320 of FIG. 3 are maintained as a cumulative set of counters or frequencies during processing when counting the frequencies of the different byte symbols 320a or numeric values 320b of such symbols in each block being added, or evaluated for addition to the compression unit. Thus, processing of 906 includes counting the frequency of each occurrence of the different symbols 320a or numeric values 320b of such symbols and adding the counts determined for block 3 to those existing frequencies 320c in the table from blocks 1 and 2. In this manner, the frequency or counter values 320c denote the cumulative, total or aggregate occurrence of each of the symbols 320a or numeric values 320b across the proposed compression unit of aggregated/combined blocks 1, 2 and 3. Using such cumulative frequencies of 320c for the aggregated blocks 1, 2 and 3, associated probabilities 320d may be calculated and used to determine a cumulative entropy value for the proposed compression unit including all 3 blocks 1, 2 and 3. In this example as denoted by 906, assume the cumulative entropy value for blocks 1, 2 and 3 is 4.67 whereby the estimated compressed size for blocks 1, 2 and 3 (e.g., using EQUATION 3) is 7 KB, and whereby the estimated compression ratio is 12:7. From step 906, control proceeds to step 907a where, based on specified criteria, the cumulative entropy value of 4.0 and/or the estimated compression ratio of 2:1 of 904 may be compared, respectively, to the entropy value of 4.67 and/or the estimated compression ratio of 12:7 from 906 to evaluate whether there is sufficient benefit (e.g., in terms of space savings or increased compression rate) to compress blocks 1 and 2 as a single unit, or whether to additionally add block 3 to the compression unit (e.g., compress blocks 1, 2 and 3 combined as a single compression unit). In this example, such comparisons and criteria at step 907a may determine that, due to the entropy value of 4.67 from step 906 being larger than the entropy value 4.0 from step 904, and also due to the compression ratio of 12:7 of step 906 being smaller than the compression ratio of 2:1 from step 904 (e.g., no increased compression ratio and space savings) there is insufficient additional benefit to add block 3 to the compression unit whereby only blocks 1 and 2 are compressed as a single unit. In this case, step 907a evaluates to no or false and processing proceeds from step 907a to 908 where blocks 1 and 2 are compressed as a single compression unit. From step 908, control proceeds to step 910 where the table of cumulative frequencies 320 is reinitialized and block 3 is further evaluated as candidate as a new "first block" of the next compression unit being determined. For example, block 3 may be further evaluated in a manner similar to block 1 in step 902. In particular, assume block 3 is being considered as a candidate as a new "first block" of the next compression unit and that block 3 has an entropy value of 7. In this case, processing determines that block 3 is uncompressible since block 3's entropy value of 7 is larger than the entropy threshold of 6.5. Block 3 is not further considered for compression and now the next block 4 is further evaluated as candidate as a new "first block" of the next compression unit being determined. For example, block 4 may be further evaluated in a manner similar to block 1 in step 902 and similar to that as just described for block 3. For example, processing determines whether block 4's entropy value<the entropy threshold? If so, block 4 is now the first block of the next compression unit and processing continues in a manner consistent with that as described above to evaluate whether adding each successive next block to the compression unit including block 4 adds sufficient benefit.

As another illustration, assume at step 910 that block 3 is being considered as a candidate as a new "first block" of the next compression unit and that block 3 has an entropy value of 5. In this case, processing determines that block 3 is compressible since block 3's entropy value of 5 is less than the entropy threshold of 6.5, whereby block 3 is now the first block in the next compression unit. Subsequent processing further successively evaluates whether adding one or more blocks to the same compression unit (whereby all blocks of single compression unit will be compressed as a single compressible unit) is beneficial/adds sufficient benefit in terms of added space savings and increased compression ratio. For example, in a manner similar to that as described in step 904, processing now evaluates whether compressing the combination of blocks 3 and 4 as a single compression unit provides sufficient benefit over just compressing block 3 as a single compression unit. For example, processing determines whether the cumulative entropy value (using cumulative frequencies) for the combination of blocks 3 and 4's<entropy value of block 3? If so, block 4 is now added with block 3 into the same compression unit. Processing continues in a manner consistent with that as described above to evaluate whether adding each successive next block, such as block 5, to the compression unit including both blocks 3 and 4 adds sufficient benefit.

As an aside, if step 907a evaluates to yes or true, processing continues with step 907b to further evaluate adding the next block 4, and possibly other blocks, to the current compression unit. Generally, processing may continue to successively evaluate, on a per block basis, whether to add another block to the current compression unit. Processing that may be performed in connection with step 907b is similar to that as described in more details elsewhere herein, for example, such as in connection with FIG. 7B.

It should be noted that an embodiment may specify a maximum allowable number of blocks or a maximum allowable size of a compression unit. Such a maximum may be determined, for example, in accordance with the number of blocks (or size thereof) such as in connection with FIG. 6A or 6B at which a maximum compression rate or maximum space savings may be obtained. In this manner, processing may be performed to form compression units each of which has a size that does not exceed the specified maximum. In such an embodiment, the processing may not attempt to add more blocks to a compression unit if the compression unit's size would exceed the specified maximum.

As noted above and elsewhere herein, such processing as just described may also be performed with respect to ILC where such blocks written may be processed inline as part of the I/O or data path. It should be noted that such blocks may be stored in at sequentially logically consecutive blocks in the data set and may be written in any order in connection with one or more different I/Os.

Figure 7B:
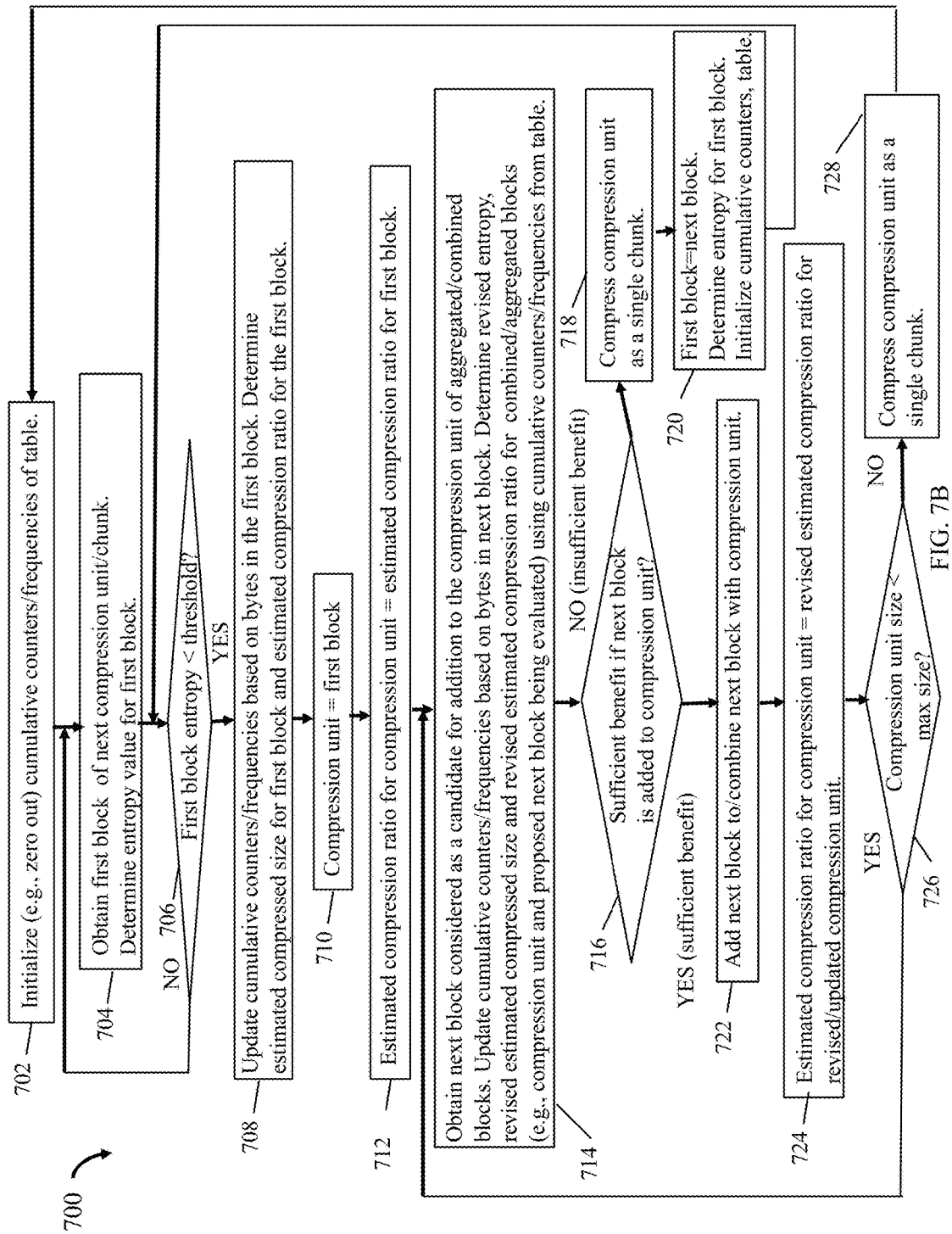

Referring to FIG. 7B, shown is a flowchart of processing that may be performed in an embodiment in accordance with techniques herein. The flowchart 700 summarizes processing described above in connection with FIG. 7A. At step 702, the cumulative counters or frequencies, as well as the probabilities, of the table 320 may be initialized (e.g., zeroed out). From step 702, control proceeds to step 704 where the first block of the next compression unit is obtained and the entropy value for the first block may be calculated. From step 704, control proceeds to step 706 where a determination is made as to whether the first block's entropy value is less than the entropy threshold. If step 706 evaluates to no, control proceeds to step 704. If step 706 evaluates to yes, control proceeds to step 708.

Step 708 includes updating the counts or frequencies 320c of the symbols 320a or associated numeric values 320 for the first block obtained in step 704. Step 708 also includes determining the estimated compression ratio for the first block. From step 708, control proceeds to step 710 where the first block is added to the compression unit currently being formed. From step 710 control proceeds to step 712 where the estimated compression ratio for the compression unit is updated to be the estimated compression ratio for the first block. From step 712, control proceeds to step 714. At step 714, processing is performed that includes obtaining the next block considered as a candidate for addition to the compression unit of aggregated or combined blocks. Step 714 includes updating the cumulative counters/frequencies of the table based on the bytes in the next block. Step 714 includes determining a revised entropy, revised estimated compressed size and revised estimated compression ratio for the combined/aggregated blocks (e.g., compression unit and proposed next block being evaluated) using cumulative information from the table, such as the cumulative counters/frequencies from the table. Control proceeds from step 714 to step 716.

At step 716, a determination is generally made using specified criteria as to whether adding the next block to the compression unit adds sufficient benefit (e.g., in terms of additional compression benefit and/or additional space savings benefit) over just compressing the one or more blocks currently in the compression unit without adding the next block. Step 716 may include criteria that includes determining whether the revised estimated compression ratio (of the current compression unit without the next block added) is larger than the revised estimated compression ratio (of the revised compression unit with the next block added). Step 716 may include criteria that includes determining whether the entropy value of the current compression unit (without the next block added) is less than the revised entropy value (of the revised compression unit with the next block added). If step 716 evaluates to no, whereby it is determined that adding the next block to the compression unit would not result in obtaining a sufficient additional compression benefit, control proceeds to step 718 where the next block is not added to the compression unit. At step 718, the current compression unit, which does not include the next block, is compressed as a single unit or chunk. Control proceeds from step 718 to step 720 where the first block of the next compression unit to be formed is assigned the next block (to be further evaluated in subsequent processing). Step 720 includes initializing the table including the cumulative frequencies or counters. Step 720 also includes determining the entropy value for the first block (which is now the next block that was not added to the compression unit). From step 720 control proceeds to step 706.

If step 716 evaluates to yes, whereby it is determined that adding the next block to the compression unit would result in obtaining a sufficient additional compression benefit, control proceeds to step 22 where the next block is t added to the compression unit. From step 722, control proceeds to step 724 where the estimated compression ratio for compression unit is assigned the revised estimated compression ratio for revised/updated compression unit. From step 724, control proceeds to step 726 where a determination is made as to whether the compression unit size is less than a specified maximum size. If step 726 evaluates to no, control proceeds to step 728 to compress the current compression unit as a single chunk. Control proceeds from step 728 to step 702 to form the next compression unit of one or more blocks. If step 726 evaluates to yes, control proceeds to step 714 to obtain the next block and evaluate whether to further include such next block in the current compression unit.

What will now be described is a second embodiment illustrating use of techniques herein in which entropy may be used in determining and selecting how many blocks to compress as a single unit. For this example, assume there is an existing data set stored on physical storage and processing is performed to compress the data set using techniques herein with variable compression unit sizes and using entropy of the individual blocks, rather than cumulative entropy values based on cumulative frequencies, to determine the variable compression unit sizes. In this second embodiment and example, assume use of a 4 KB block size. Blocks of the data set may be processed in logical sequential order based on the logical address space of the data set. Generally, processing may include a next block in a compression unit along with one or more other blocks if each such block has an individual entropy value below the entropy threshold and additionally if the entropy values of all such blocks are similar. A determination of whether entropy values are similar may be made using any suitable technique. Examples of such techniques of determining whether a group of numeric values is sufficiently similar (e.g., do not vary from one another more than a specified threshold amount, are all within a specified range, do not vary from one another by more than a number of standard deviations with respect to the mean/average of such values) are described herein.

Figure 8A:
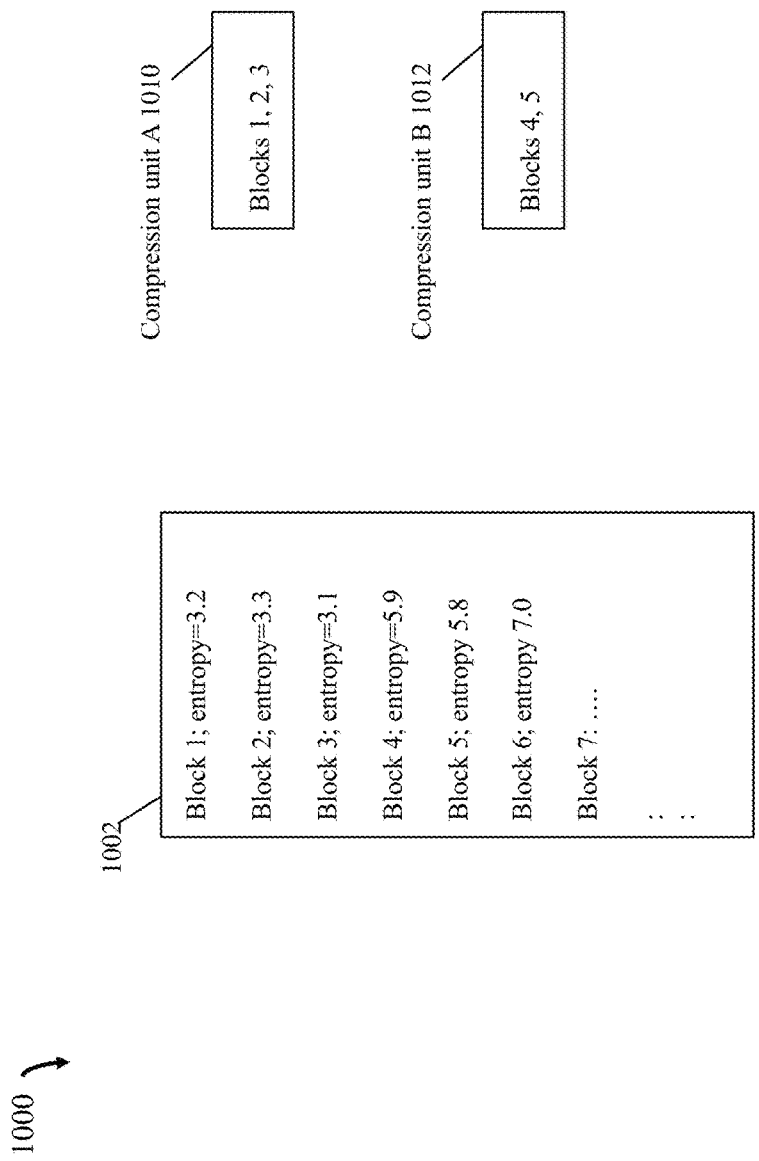

Referring to FIG. 8A, shown is an example 1000 illustrating use of techniques herein in one embodiment. The example 1000 includes 1002, a sequence of blocks 1002 and associated entropy values. The entropy values in 1002 may be entropy values determined for the individual blocks of 1002. Consistent with discussion herein, the entropy values of 1002 may be determined as described herein, such as using EQUATIONS 1 and/or 2. Block 1 may be received and its entropy value of 3.2 may be determined. Processing may determine whether block 1's entropy value is less than a specified entropy threshold, such as 6.0. If so, block 1 is added to the current compression unit. Otherwise, block 1 is determined as uncompressible and is not added to the compression unit. In this example, block 1's entropy value of 3.2 is less than the entropy threshold and is added to the compression unit A 1010. In at least one embodiment, criteria may be specified that must be met in order to add the first block to a new compression unit. As described above in connection with block 1, for a first block added to a compression unit, the block's entropy value is less than the entropy threshold.

Block 2 is received and evaluated to determine whether or not to add block 2 to the compression unit A 1010. In at least one embodiment, criteria may be specified that must be met in order to add subsequent blocks to a compression unit. In order to added block 2 to compression unit A 1010, the criteria may specify that block 2's entropy value must be less than the entropy threshold, and additionally, the entropy values of all blocks in the compression unit must be similar. In connection with determining whether the entropy values of blocks 1 and 2 are "similar" any suitable criteria may be specified. For example, an embodiment may specify an absolute range of entropy values (e.g., 3.0 to 4.0), or a relative range or difference (e.g., all within the same 1.0 window) within which all entropy values of the same compression unit must fall. Thus, when evaluating whether to add a new block to an existing compression unit including one or more blocks, the new block and the one or more blocks already in the compression unit should have entropy values that all fall within a specified window or range. For example, an embodiment may specify that all entropy values of the blocks should fall within the same relative entropy value window or range of 1.0. In other words, the range may be defined by determining the highest and lowest entropy values to define the range endpoints. The distance between the highest and lowest entropy values should define a range or distance of no more than 1.0 and all other entropy values should fall within this range. As another example of determining similarity, an embodiment may specify that all entropy values of all blocks in the same compression unit should not vary by more than a specified number of standard deviation(s) from the mean of such values. To illustrate, the mean of all entropy values of all blocks in the same compression unit may be determined and then the standard deviation with respect to such a mean may be determined. A threshold amount of difference may be specified in terms of the standard deviation. For example, the criteria may specify that all entropy values be within 1 standard deviation of the mean, 0.5 standard deviations of the mean, and the like.

In this example, assume that the criteria indicates that all entropy values should fall within the same 1.0 window or range and that all entropy values should be less than the specified entropy threshold. Processing may determine whether block 2's entropy value is less than a specified entropy threshold, such as 6.0. If so, additional criteria may be evaluated with respect to block 2 to determine whether to add block 2 to the current compression unit. Otherwise, if block 2's entropy value is not less than the entropy threshold, block 2 is determined as uncompressible and is not added to the compression unit. In this example, block 2's entropy value of 3.3 is less than the entropy threshold. Additionally, the difference or numeric distance between the entropy values of blocks 1 and 2 is only 0.1 whereby block 1 and block 2 have similar entropy values. Thus, the criteria is met and block 2 is added to the compression unit A 1010.

Block 3 is received and evaluated in a manner similar to that as just described for block 2 to determine whether or not to add block 3 to the compression unit A 1010 (that currently includes blocks 1 and 2). As noted above, the criteria indicates that all entropy values should fall within the same 1.0 window or range and that all entropy values should be less than the specified entropy threshold. Processing may determine whether block 3's entropy value is less than a specified entropy threshold, such as 6.0. If so, additional criteria may be evaluated for block 3. Otherwise, if block 3's entropy value is not less than the specified threshold, block 3 is determined as uncompressible and is not added to the compression unit. In this example, block 3's entropy value of 3.1 is less than the entropy threshold of 6.0. Additionally, the maximum difference or numeric distance between any two of the entropy values of blocks 1, 2 and 3 is only 0.2 whereby block 1, block 2, and block 3 are determined to have similar entropy values. Thus, the criteria is met and block 3 is added to the compression unit A 1010.

Block 4 is received and evaluated in a manner similar to that as just described for blocks 2 and 3 to determine whether or not to add block 4 to the compression unit A 1010 (that currently includes blocks 1, 2 and 3). As noted above, the criteria indicates that all entropy values should fall within the same 1.0 window or range and that all entropy values should be less than the specified entropy threshold. Processing may determine whether block 4's entropy value is less than a specified entropy threshold, such as 6.0. If so, additional criteria may be evaluated with respect to block 4. Otherwise, if block 4's entropy value is not less than the entropy threshold, block 4 is determined as uncompressible and is not added to the compression unit. In this example, block 4's entropy value of 5.9 is less than the entropy threshold of 6.0. Thus the first requirement of the criteria is met. However, the maximum difference or numeric distance between any two of the entropy values of blocks 1, 2, 3 and 4 is 2.8. (e.g., block 3's entropy=3.1 and block 4's entropy=5.9, with a difference of 2.8). Thus, all entropy values for blocks 1, 2, 3 and 4 do not fall within the same 1.0 window or range and processing determines that block 4's entropy values is not similar to the entropy values of blocks 1, 2 and 3. Thus, the last requirement (e.g., similarity of entropy values) of the criteria is not met and block 4 is not added to the existing compression unit A 1010.

At this point, processing determines that no additional blocks are added to the compression unit A 1010 including blocks 1, 2 and 3 and compresses compression unit A 1010 as a single compressible chunk. Processing resumes now to form further compression units each including one or more logically sequentially consecutively located blocks in the data set. Processing may resume with forming compression unit B 1012 and block 4. Block 4 is now evaluated as to whether it meets criteria specified to be added as a first block of a new/next compression unit 1012. As described above in connection with block 1, the criteria may specify that each block's entropy value should be less than the entropy threshold, such as 6.0. In this example, block 4's entropy value of 5.9 is less than the threshold and is therefore added as the first block of compression unit B 1012.

Block 5 is received and evaluated in a manner similar to that as described above to determine whether or not to add block 5 to the compression unit B 1012 (that currently includes block 4). As noted above, the criteria indicates that all entropy values should fall within the same 1.0 window or range and that all entropy values should be less than the specified entropy threshold. Processing may determine whether block 5's entropy value is less than a specified entropy threshold, such as 6.0. If so, block 5 is further evaluated with respect to other criteria. Otherwise, if block 5's entropy value is not less than the entropy threshold, block 5 is determined as uncompressible and is not added to the compression unit 1012. In this example, block 5's entropy value of 5.8 is less than the entropy threshold of 6.0. Additionally, the maximum difference or numeric distance between the entropy values (e.g., 5.9 and 5.8, respectively) of blocks 4 and 5 is 0.1, whereby block blocks 4 and 5 are determined to have similar entropy values. Thus, the criteria is met and block 5 is added to the compression unit B 1012.

Block 6 is received and evaluated in a manner similar to that as described above to determine whether or not to add block 6 to the compression unit B 1012 (that currently includes blocks 4 and 5). As noted above, the criteria indicates that all entropy values should fall within the same 1.0 window or range and that all entropy values should be less than the specified entropy threshold. Processing may determine whether block 6's entropy value is less than a specified entropy threshold, such as 6.0. If so, block 6 is further evaluated with respect to other criteria. Otherwise, if block 6's entropy value is not less than the entropy threshold, block 6 is determined as uncompressible and is not added to the compression unit 1012. In this example, block 6's entropy value of 7.0 is not less than the entropy threshold of 6.0 and is therefore determined as uncompressible and not added to the compression unit B 1012.

At this point, processing determines that no additional blocks are added to the compression unit B 1012 including blocks 4 and 5. Additionally, compression unit B 1012 may be compressed as a single compressible chunk. Processing resumes now to form further compression units each including one or more logically sequentially consecutively located blocks in the data set. Processing may resume with forming a next compression unit. In this example, block 6 is not further considered as a possible first block for the next compression unit since block 6's entropy value is not less than the entropy threshold. Thus, processing continues in a manner similar to that as described above in connection with other blocks to form a next compression unit by evaluating whether block 7 meets specified criteria to be a first block of the next compression unit.

It should be noted that an embodiment may specify a maximum allowable number of blocks or a maximum allowable size of a compression unit. Such a maximum may be determined, for example, in accordance with the number of blocks (or size thereof) such as in connection with FIG. 6A or 6B at which a maximum compression rate or maximum space savings may be obtained. In this manner, processing may be performed to form compression units each of which has a size that does not exceed the specified maximum. In such an embodiment, the processing may not attempt to add more blocks to a compression unit if the compression unit's size would exceed the specified maximum.

Figure 8B:
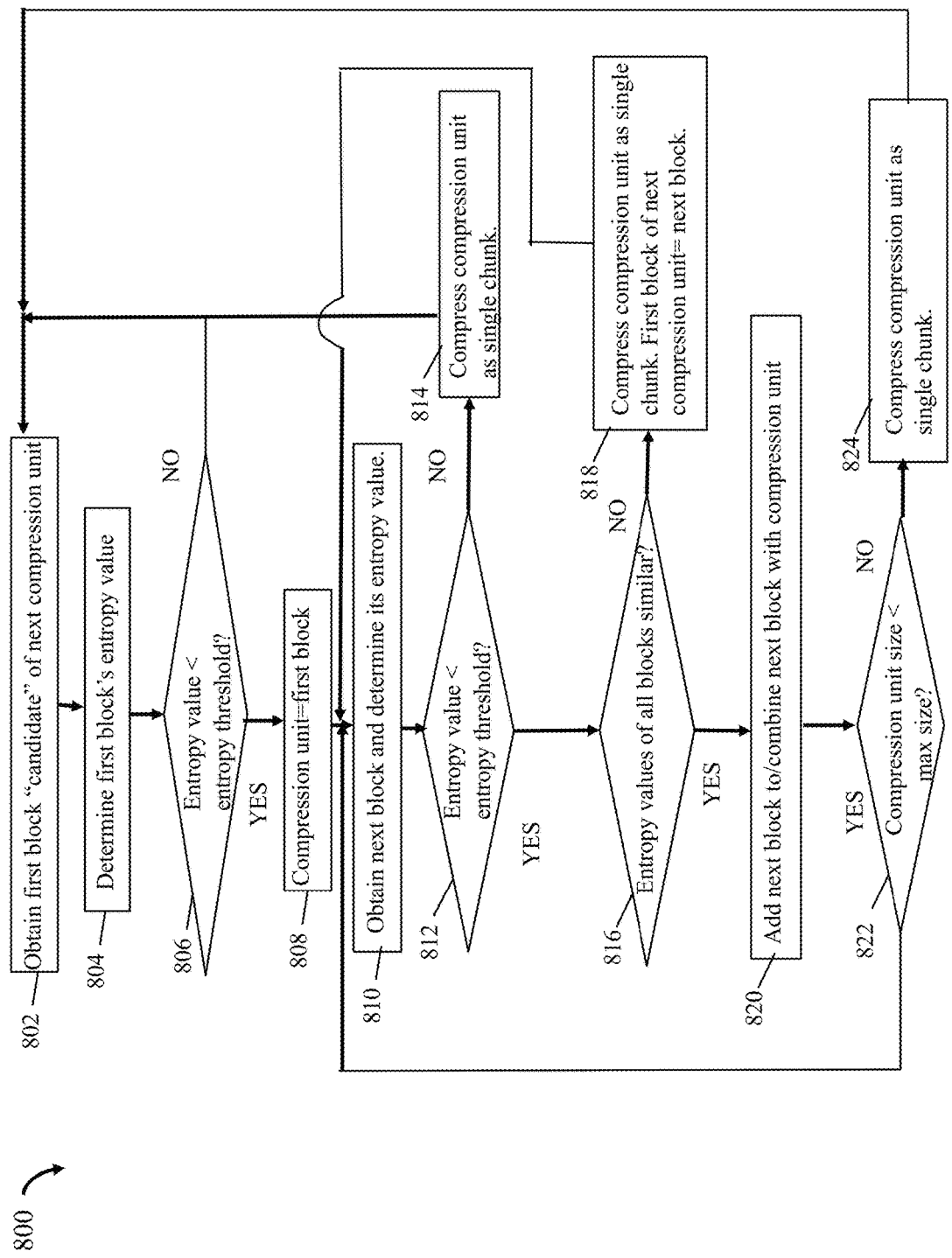

Referring to FIG. 8B, shown is a flowchart of processing that may be performed in an embodiment in accordance with techniques herein. The flowchart 800 summarizes processing described above in connection with FIG. 8A. At step 802, the first block considered as a candidate for inclusion in the next compression unit is obtained. From step 802, control proceeds to step 804 where the first block's entropy value is determined. From step 804, control proceeds to step 806 where a determination is made as to whether the entropy value of the first block is less than the entropy threshold. If step 804 evaluates to no, control proceeds to step 802. If step 804 evaluates to yes, control proceeds to step 808 where the first block is added to the compression unit. From step 808, control proceeds to step 810 where the next block is obtained and its entropy value is determined. From step 810, control proceeds to step 812 where a determination is made as to whether the entropy value for the next bock is less than the entropy threshold. If step 812 evaluates to no, control proceeds to step 814 where the current compression unit's one or more block may be compressed as a single chunk. From step 814, control proceeds to step 802. If step 812 evaluates to yes, control proceeds to step 816 to consider the further criteria where a determination is made as to whether the entropy values of the next block and the block(s) currently included in the compression unit are similar.

If step 816 evaluates to no (e.g., not similar), control proceeds to step 818. In step 818, the next block is not added to the compression unit. Rather, the one or more blocks currently in the compression unit may be compressed as a single chunk. Additionally, in step 818, the next block is added as the first block of the next compression unit to be formed. From step 818, control proceeds to step 810 to continue processing for forming the next compression unit. If step 816 evaluates to yes (e.g., similar), control proceeds to step 820. At step 820, the next block is added to, or combined with, the compression unit. From step 820, control proceeds to step 822. At step 822, a determination is made as to whether the compression unit size is less than the specified maximum allowable size for a compression unit. If step 822 evaluates to no, control proceeds to step 824 where the current compression unit may be compressed as a single chunk. From step 824, control proceeds to step 802. If step 822 evaluates to yes, control proceeds to step 810.

It should be noted that the examples herein, such as described in connection with FIGS. 7A and 8A, illustrate use of techniques herein where the blocks or chunks may be written in a logical sequence matching that of the logical sequentially located consecutive blocks in the data set (e.g., writes may be received and evaluated in an order forming a sequential pattern such as when the order of writes, in sequence, is to blocks 1, 2, 3 4 and 5, as in FIG. 8A). However, techniques herein are not so limited. More generally, the writes to such blocks may be received and/or issued in any random order. For example, techniques herein may be used with blocks 1-5 where the writes to blocks 1-5 in FIG. 8A may be received and/or issued in any random order. Techniques as described herein, such as in connection with FIGS. 7A, 7B, 8A and 8B, may be used to combine blocks or chunks which are logically sequentially located in the data file but where such blocks or chunks may be sequentially written or may be randomly written in any order. Such techniques herein may also be used to combine multiple blocks or chunks into the same compression unit where the multiple blocks may be logically sequentially located in the data set, and where writes may be issued to the multiple blocks sequentially (e.g., in the order in which they are combined into the compression unit) or randomly (e.g., in a different order in which the blocks are evaluated and considered for combining into the compression unit).

Additionally, it should be generally noted that the blocks or chunks processed using techniques herein, such as those combined into a single compression unit, may be written by one or more writes I/O operations and processed inline (e.g., such as in connection with ILC processing) or offline (e.g., such as not part of ILC processing when using a static data set not being written to).

The techniques herein may be implemented using any suitable hardware and/or software, such as executing code using a processor where the code is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable. The processor may be any suitable processor such as, for example, a processor of a computer, data storage system, or other component, such as an ASIC (application specified integrated circuit).

While the invention has been disclosed in connection with embodiments shown and described in detail, their modifications and improvements thereon will become readily apparent to those skilled in the art. Accordingly, the spirit and scope of the present invention should be limited only by the following claims.

What is claimed is:

1. A method of data processing for a data set comprising:
    performing first processing that forms a first compression unit, wherein the first compression unit includes a first plurality of data chunks including a first data chunk having a first entropy value less than an entropy threshold, the first processing including:
        receiving a second data chunk;
        determining, in accordance with criteria, whether to add the second data chunk to the first compression unit; and
        responsive to determining to add the second data chunk to the first compression unit, adding the second data chunk to the first compression unit; and
    compressing the first compression unit as a single compressible unit compressing the first compression unit as a single compressible unit, and wherein said determining whether to add the second data chunk to the first compression unit further includes:
        determining whether a revised estimated compression ratio associated with adding the second data chunk to the first compression unit is larger than an estimated compression ratio associated with the first compression unit without the second data chunk; and
        responsive to determining the revised estimated compression ratio is larger than the estimated compression ratio, determining to add the second data chunk to the first compression unit.

2. The method of claim 1, wherein the criteria specifies to add the second data chunk to the first compression unit if adding the second data chunk to the first compression unit is estimated to provide at least a specified storage savings benefit.

3. The method of claim 1, wherein the first data chunk and the second data chunk are located at consecutive sequential logical addresses of the data set.

4. The method of claim 3, wherein the first data chunk is written by a first I/O operation and the second data chunk is written by a second I/O operation.

5. The method of claim 4, wherein the first processing is performed as part of inline processing of an I/O path when processing the first I/O operation and the second I/O operation.

6. The method of claim 4, wherein the first processing is performed offline and not part of inline processing of an I/O path when processing the first I/O operation and the second I/O operation.

7. The method of claim 1, wherein the first compression unit is a first size and includes a first number of data chunks of the data set and wherein the method includes:
    forming a second compression unit that is a second size and includes a second number of data chunks of the data set, the first number being different than the second number; and
    compressing the second compression unit as a single compressible unit.

8. A system comprising:
    a processor; and
    a memory comprising code stored thereon that, when executed, performs a method of data processing for a data set comprising:
        performing first processing that forms a first compression unit, wherein the first compression unit includes a first plurality of data chunks including a first data chunk having a first entropy value less than an entropy threshold, the first processing including:
            receiving a second data chunk;
            determining, in accordance with criteria, whether to add the second data chunk to the first compression unit; and
            responsive to determining to add the second data chunk to the first compression unit, adding the second data chunk to the first compression unit; and
        compressing the first compression unit as a single compressible unit compressing the first compression unit as a single compressible unit, and wherein said determining whether to add the second data chunk to the first compression unit further includes:
            determining whether a revised estimated compression ratio associated with adding the second data chunk to the first compression unit is larger than an estimated compression ratio associated with the first compression unit without the second data chunk; and
            responsive to determining the revised estimated compression ratio is larger than the estimated compression ratio, determining to add the second data chunk to the first compression unit.

9. A non-transitory computer readable medium comprising code stored thereon that, when executed, performs a method of data processing for a data set comprising:
    performing first processing that forms a first compression unit, wherein the first compression unit includes a first plurality of data chunks including a first data chunk having a first entropy value less than an entropy threshold, the first processing including:
  receiving a second data chunk;
  determining, in accordance with criteria, whether to add the second data chunk to the first compression unit; and
  responsive to determining to add the second data chunk to the first compression unit, adding the second data chunk to the first compression unit; and
compressing the first compression unit as a single compressible unit compressing the first compression unit as a single compressible unit, and wherein said determining whether to add the second data chunk to the first compression unit further includes:
  determining whether a revised estimated compression ratio associated with adding the second data chunk to the first compression unit is larger than an estimated compression ratio associated with the first compression unit without the second data chunk; and
  responsive to determining the revised estimated compression ratio is larger than the estimated compression ratio, determining to add the second data chunk to the first compression unit.

10. The non-transitory computer readable medium of claim 9, wherein the criteria specifies to add the second data chunk to the first compression unit if adding the second data chunk to the first compression unit is estimated to provide at least a specified storage savings benefit.

11. The non-transitory computer readable medium of claim 9, wherein the first data chunk and the second data chunk are located at consecutive sequential logical addresses of the data set, wherein the first data chunk is written by a first I/O operation and the second data chunk is written by a second I/O operation.

12. The non-transitory computer readable medium of claim 11, wherein the first I/O operation and the second I/O operations are sequentially issued I/O operations.

13. The non-transitory computer readable medium of claim 11, wherein the first I/O operation and the second I/O operations are not sequentially issued I/O operations.

14. A method of data processing for a data set comprising:
  performing first processing that forms a first compression unit, wherein the first compression unit includes a first plurality of data chunks including a first data chunk having a first entropy value less than an entropy threshold, the first processing including:
    receiving a second data chunk;
    determining, in accordance with criteria, whether to add the second data chunk to the first compression unit; and
    responsive to determining to add the second data chunk to the first compression unit, adding the second data chunk to the first compression unit; and
  compressing the first compression unit as a single compressible unit compressing the first compression unit as a single compressible unit, wherein said determining whether to add the second data chunk to the first compression unit includes:
    determining whether a cumulative entropy value associated with adding the second data chunk to the first compression unit is smaller than another entropy value associated with the first compression unit without the second data chunk; and
  responsive to determining the cumulative entropy value associated with adding the second data chunk to the first compression unit is smaller than the another entropy value associated with the first compression unit without the second data chunk, determining to add the second data chunk to the first compression unit.

15. The method of claim 14, wherein the second data chunk is added to the first compression unit, wherein the first compression unit includes at least two data chunks prior to adding the second data chunk, wherein the cumulative entropy value is an entropy value determined based on cumulative frequencies of symbols in the at least two data chunks combined with the second data chunk, and wherein the another entropy value is a second cumulative entropy value determined based on cumulative frequencies of the symbols in the at least two data chunks without the second data chunk.

16. A system comprising:
  a processor; and
  a memory comprising code stored thereon that, when executed, performs a method of data processing for a data set comprising:
    performing first processing that forms a first compression unit, wherein the first compression unit includes a first plurality of data chunks including a first data chunk having a first entropy value less than an entropy threshold, the first processing including:
      receiving a second data chunk;
      determining, in accordance with criteria, whether to add the second data chunk to the first compression unit; and
      responsive to determining to add the second data chunk to the first compression unit, adding the second data chunk to the first compression unit; and
    compressing the first compression unit as a single compressible unit compressing the first compression unit as a single compressible unit, wherein said determining whether to add the second data chunk to the first compression unit includes:
      determining whether a cumulative entropy value associated with adding the second data chunk to the first compression unit is smaller than another entropy value associated with the first compression unit without the second data chunk; and
    responsive to determining the cumulative entropy value associated with adding the second data chunk to the first compression unit is smaller than the another entropy value associated with the first compression unit without the second data chunk, determining to add the second data chunk to the first compression unit.

17. A non-transitory computer readable medium comprising code stored thereon that, when executed, performs a method of data processing for a data set comprising:
  performing first processing that forms a first compression unit, wherein the first compression unit includes a first plurality of data chunks including a first data chunk having a first entropy value less than an entropy threshold, the first processing including:
    receiving a second data chunk;
    determining, in accordance with criteria, whether to add the second data chunk to the first compression unit; and
    responsive to determining to add the second data chunk to the first compression unit, adding the second data chunk to the first compression unit; and
  compressing the first compression unit as a single compressible unit compressing the first compression unit as a single compressible unit, wherein said determining whether to add the second data chunk to the first compression unit includes:

determining whether a cumulative entropy value associated with adding the second data chunk to the first compression unit is smaller than another entropy value associated with the first compression unit without the second data chunk; and responsive to determining the cumulative entropy value associated with adding the second data chunk to the first compression unit is smaller than the another entropy value associated with the first compression unit without the second data chunk, determining to add the second data chunk to the first compression unit.

18. A method of data processing for a data set comprising:
performing first processing that forms a first compression unit, wherein the first compression unit includes a first plurality of data chunks including a first data chunk having a first entropy value less than an entropy threshold, the first processing including:
receiving a second data chunk;
determining, in accordance with criteria, whether to add the second data chunk to the first compression unit; and
responsive to determining to add the second data chunk to the first compression unit, adding the second data chunk to the first compression unit; and
compressing the first compression unit as a single compressible unit compressing the first compression unit as a single compressible unit, wherein the second chunk is added to the first compression unit, wherein a first set of one or more data chunks includes at least the first data chunk, wherein the first compression unit includes the first set of one or more data chunks prior to adding the second chunk, and wherein the criteria specifies to add the second data chunk to the first compression unit if the second data chunk has an associated entropy value less than the entropy threshold, and if the second data chunk and the first set of one or more data chunks are determined, in accordance with second criteria, to have similar entropy values.

19. The method of claim 18, wherein the second criteria includes determining whether entropy values of the second data chunk and the first set of data chunks all fall within a specified range or are no more than a threshold numerical distance from one another.

20. A system comprising:
a processor; and
a memory comprising code stored thereon that, when executed, performs a method of data processing for a data set comprising:
performing first processing that forms a first compression unit, wherein the first compression unit includes a first plurality of data chunks including a first data chunk having a first entropy value less than an entropy threshold, the first processing including:
receiving a second data chunk;
determining, in accordance with criteria, whether to add the second data chunk to the first compression unit; and
responsive to determining to add the second data chunk to the first compression unit, adding the second data chunk to the first compression unit; and
compressing the first compression unit as a single compressible unit compressing the first compression unit as a single compressible unit, wherein the second chunk is added to the first compression unit, wherein a first set of one or more data chunks includes at least the first data chunk, wherein the first compression unit includes the first set of one or more data chunks prior to adding the second chunk, and wherein the criteria specifies to add the second data chunk to the first compression unit if the second data chunk has an associated entropy value less than the entropy threshold, and if the second data chunk and the first set of one or more data chunks are determined, in accordance with second criteria, to have similar entropy values.

21. A non-transitory computer readable medium comprising code stored thereon that, when executed, performs a method of data processing for a data set comprising:
performing first processing that forms a first compression unit, wherein the first compression unit includes a first plurality of data chunks including a first data chunk having a first entropy value less than an entropy threshold, the first processing including:
receiving a second data chunk;
determining, in accordance with criteria, whether to add the second data chunk to the first compression unit; and
responsive to determining to add the second data chunk to the first compression unit, adding the second data chunk to the first compression unit; and
compressing the first compression unit as a single compressible unit compressing the first compression unit as a single compressible unit, wherein the second chunk is added to the first compression unit, wherein a first set of one or more data chunks includes at least the first data chunk, wherein the first compression unit includes the first set of one or more data chunks prior to adding the second chunk, and wherein the criteria specifies to add the second data chunk to the first compression unit if the second data chunk has an associated entropy value less than the entropy threshold, and if the second data chunk and the first set of one or more data chunks are determined, in accordance with second criteria, to have similar entropy values.

* * * * *